(12) United States Patent
Singh

(10) Patent No.: US 12,236,579 B2
(45) Date of Patent: Feb. 25, 2025

(54) APPARATUS, METHOD, AND COMPUTER PROGRAM PRODUCT FOR IMMERSIVE QUALITY MANAGEMENT SCENE MONITORING AND EVENT GENERATION

(71) Applicant: Honeywell International Inc., Charlotte, NC (US)

(72) Inventor: Ankit Singh, Apex, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/308,661

(22) Filed: Apr. 27, 2023

(65) Prior Publication Data

US 2024/0362770 A1  Oct. 31, 2024

(51) Int. Cl.
| | | |
|---|---|---|
| *G06T 7/00* | (2017.01) | |
| *G06F 3/01* | (2006.01) | |
| *G06T 19/00* | (2011.01) | |
| *G06V 20/20* | (2022.01) | |
| *G06V 20/52* | (2022.01) | |
| *G10L 15/22* | (2006.01) | |

(52) U.S. Cl.
CPC .............. *G06T 7/001* (2013.01); *G06F 3/017* (2013.01); *G06T 19/006* (2013.01); *G06V 20/20* (2022.01); *G06V 20/52* (2022.01); *G10L 15/22* (2013.01); *G06T 2200/28* (2013.01); *G06T 2207/30108* (2013.01); *G06T 2207/30168* (2013.01); *G10L 2015/223* (2013.01)

(58) Field of Classification Search
CPC ... G06T 7/001; G06T 19/006; G06T 2200/28; G06T 2207/30108; G06T 2207/30168; G06V 20/20; G06V 20/52; G06F 3/017; G06F 1/1686; G06F 3/011; G06F 8/30; G10L 15/22; G10L 2015/223; G06Q 10/063; G05B 19/41805; G05B 19/41885; G09B 5/02

See application file for complete search history.

(56) References Cited

U.S. PATENT DOCUMENTS

| | | | |
|---|---|---|---|
| 11,947,343 B1* | 4/2024 | Zia .................. | G05B 19/41805 |
| 2018/0357334 A1* | 12/2018 | Chao ................ | G05B 19/41885 |
| 2018/0357823 A1* | 12/2018 | Koniki .............. | G09B 5/02 |
| 2021/0397166 A1* | 12/2021 | Sayyarrodsari .......... | G06F 8/30 |

(Continued)

*Primary Examiner* — Richard J Hong
(74) *Attorney, Agent, or Firm* — ALSTON & BIRD LLP

(57) ABSTRACT

An immersive scene monitoring system presents a monitoring interface providing a virtual reality (VR)/augmented reality (AR) view of a scene associated with production operation(s) for a (e.g., pharmaceutical) product. The VR/AR view of the scene may be displayed with interactable graphical elements representing input fields corresponding to attributes of quality management events to be generated. The system generates the quality management events based on input (e.g., voice, gesture) received via the monitoring interface. The VR and/or AR view of the scene may be displayed with indicators of detected anomalies, and the input fields and/or corresponding attributes may be automatically populated by the system based on recognized objects and/or anomalies depicted in captured image data of the VR/AR view of the scene. The system can be configured for different scenes pertaining to different production operations and/or different products via a configuration interface.

18 Claims, 8 Drawing Sheets

(56) References Cited

U.S. PATENT DOCUMENTS

| | | | |
|---|---|---|---|
| 2022/0043431 A1* | 2/2022 | Sayyarrodsari | G06Q 10/063 |
| 2023/0135974 A1* | 5/2023 | Klein | G06F 1/1686 |
| | | | 345/156 |
| 2024/0168542 A1* | 5/2024 | Klein | G06F 3/011 |

* cited by examiner

APPARATUS, METHOD, AND COMPUTER PROGRAM PRODUCT FOR IMMERSIVE QUALITY MANAGEMENT SCENE MONITORING AND EVENT GENERATION

TECHNICAL FIELD

Embodiments of the present disclosure generally relate to generating quality management events, and specifically, in some examples, to interfaces for generating quality management events.

BACKGROUND

Applicant has identified example technical challenges and difficulties associated with interfaces for generating quality management events. Through applied effort, ingenuity, and innovation, Applicant has solved problems relating to interfaces for generating quality management events.

BRIEF SUMMARY

According to one aspect, example embodiments of the present disclosure include an apparatus comprising at least one processor and at least one non-transitory memory comprising program code stored thereon. The at least one non-transitory memory and the program code are configured to, with the at least one processor, cause the apparatus to at least: receive immersive scene configuration data associated with a scene of an operational system, wherein the immersive scene configuration data is generated based at least in part on captured image data depicting at least one past instance of the scene of the operational system; present an immersive scene monitoring interface based at least in part on captured image data depicting a current instance of the scene of the operational system, wherein the immersive scene monitoring interface comprises a virtual reality or augmented reality view of the scene displayed on an immersive scene monitoring mobile device; receive quality management event generation input via the immersive scene monitoring interface; generate one or more quality management events with respect to the current instance of the scene based at least in part on the quality management event generation input and the immersive scene configuration data; and store the one or more quality management events in a data store of a quality management system associated with the operational system.

In some embodiments, the captured image data depicting the at least one past instance of the scene comprises image data depicting the scene under normal operating conditions and/or under known anomalous operating conditions.

In some embodiments, the quality management event generation input comprises voice commands and/or recognized gestures detected via the immersive scene monitoring interface and the immersive scene monitoring mobile device.

In some embodiments, the quality management event generation input comprises input indicative of selected event types of quality management events to be generated and/or input indicative of one or more values corresponding to one or more attributes associated with quality management events to be generated.

In some embodiments, generating the one or more quality management events based at least in part on the immersive scene configuration data comprises detecting, via an object recognition process, one or more objects in the image data depicting the current instance of the scene based at least in part on the immersive scene configuration data, retrieving stored object data associated with the detected one or more objects, and automatically populating one or more input fields corresponding to one or more attributes associated with quality management events to be generated based at least in part on the retrieved object data.

In some embodiments, generating the one or more quality management events comprises capturing media data depicting the current instance of the scene, receiving via the immersive scene monitoring interface media selection input indicative of selected media clips corresponding to portions of the captured media data depicting the current instance of the scene, and generating the one or more quality management events to comprise the selected media clips.

In some embodiments, presenting the immersive scene monitoring interface comprises: detecting one or more anomalies in the image data depicting the current instance of the scene via an object recognition process based at least in part on the image data depicting the current instance of the scene and the immersive scene configuration data; and presenting the immersive scene monitoring interface based at least in part on the detected one or more anomalies.

In some embodiments, the immersive scene monitoring mobile device is a wearable device.

In some embodiments, the image data depicting the current scene is captured via one or more embedded cameras of the immersive scene monitoring mobile device and/or one or more cameras that are external with respect to the immersive scene monitoring mobile device, positioned at the scene, and in communication with the immersive scene monitoring mobile device.

In some embodiments, the operational system is associated with a pharmaceutical research, manufacturing, and/or distribution process, and the scene of the operational system comprises views of laboratory, production line, and/or material handling environments associated with the pharmaceutical research, manufacturing, and/or distribution process.

According to another aspect, embodiments of the present invention feature a method comprising: receiving immersive scene configuration data associated with a scene of an operational system, wherein the immersive scene configuration data is generated based at least in part on captured image data depicting at least one past instance of the scene of the operational system; presenting an immersive scene monitoring interface based at least in part on captured image data depicting a current instance of the scene of the operational system, wherein the immersive scene monitoring interface comprises a virtual reality or augmented reality view of the scene displayed on an immersive scene monitoring mobile device; receiving quality management event generation input via the immersive scene monitoring interface; generating one or more quality management events with respect to the current instance of the scene based at least in part on the quality management event generation input and the immersive scene configuration data; and storing the one or more quality management events in a data store of a quality management system associated with the operational system.

According to another aspect, embodiments of the present invention feature a computer program product comprising at least one non-transitory computer-readable storage medium having computer-readable program code portions stored therein. The computer-readable program code portions comprise an executable portion configured to: receive immersive scene configuration data associated with a scene of an operational system, wherein the immersive scene configuration data is generated based at least in part on captured image data depicting at least one past instance of the scene of the operational system; present an immersive scene monitoring interface based at least in part on captured image data depicting a current instance of the scene of the operational system, wherein the immersive scene monitoring interface comprises a virtual reality or augmented reality view of the scene displayed on an immersive scene monitoring mobile device; receive quality management event generation input via the immersive scene monitoring interface; generate one or more quality management events with respect to the current instance of the scene based at least in part on the quality management event generation input and the immersive scene configuration data; and store the one or more quality management events in a data store of a quality management system associated with the operational system.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
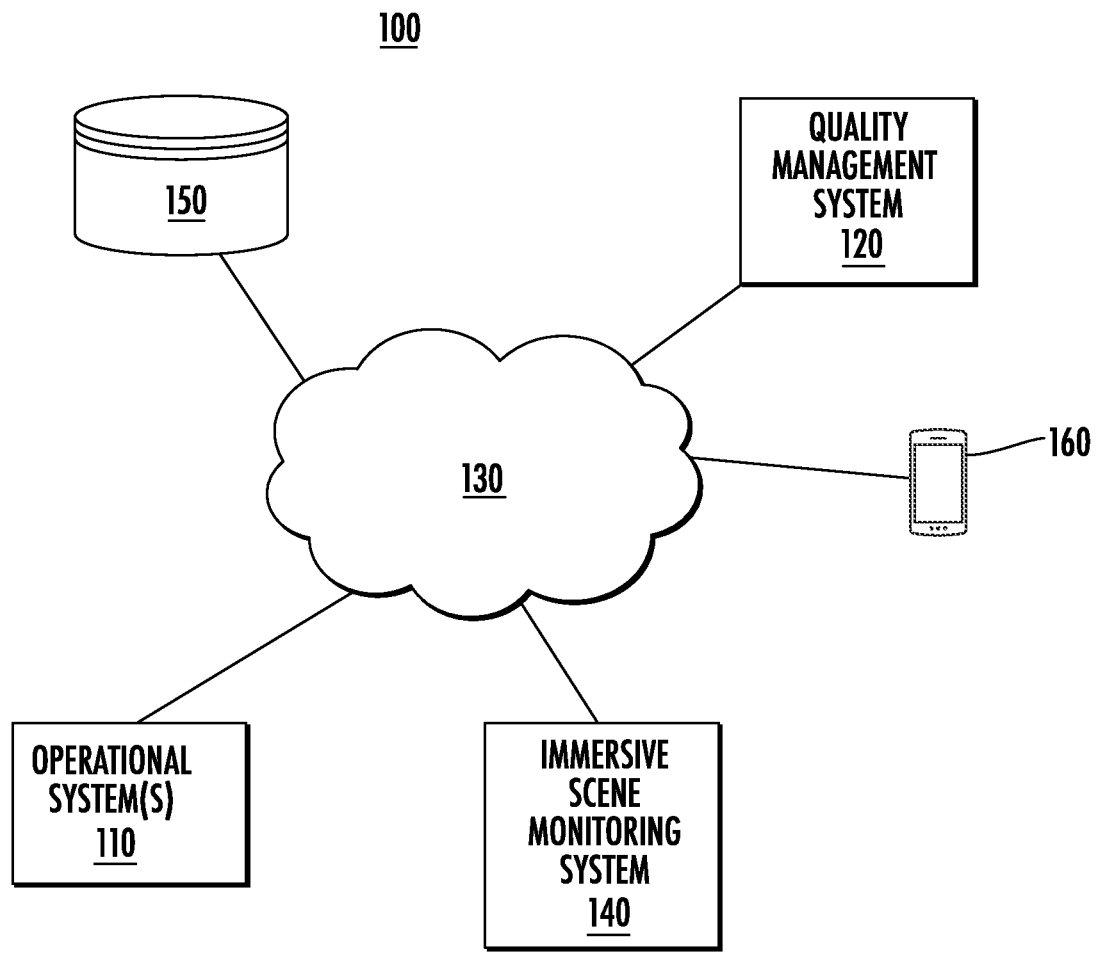
Figure 2:
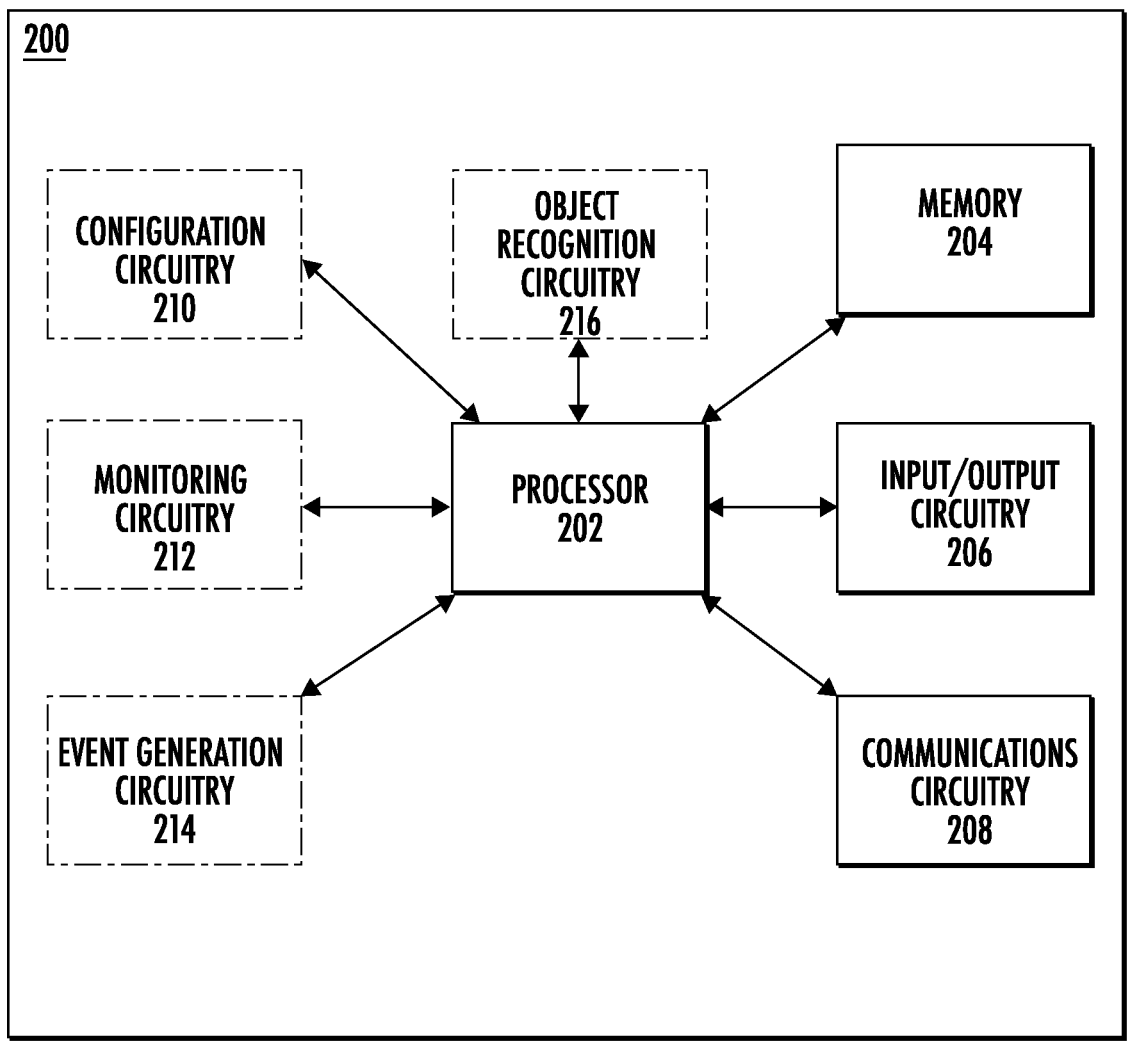
Figure 3:
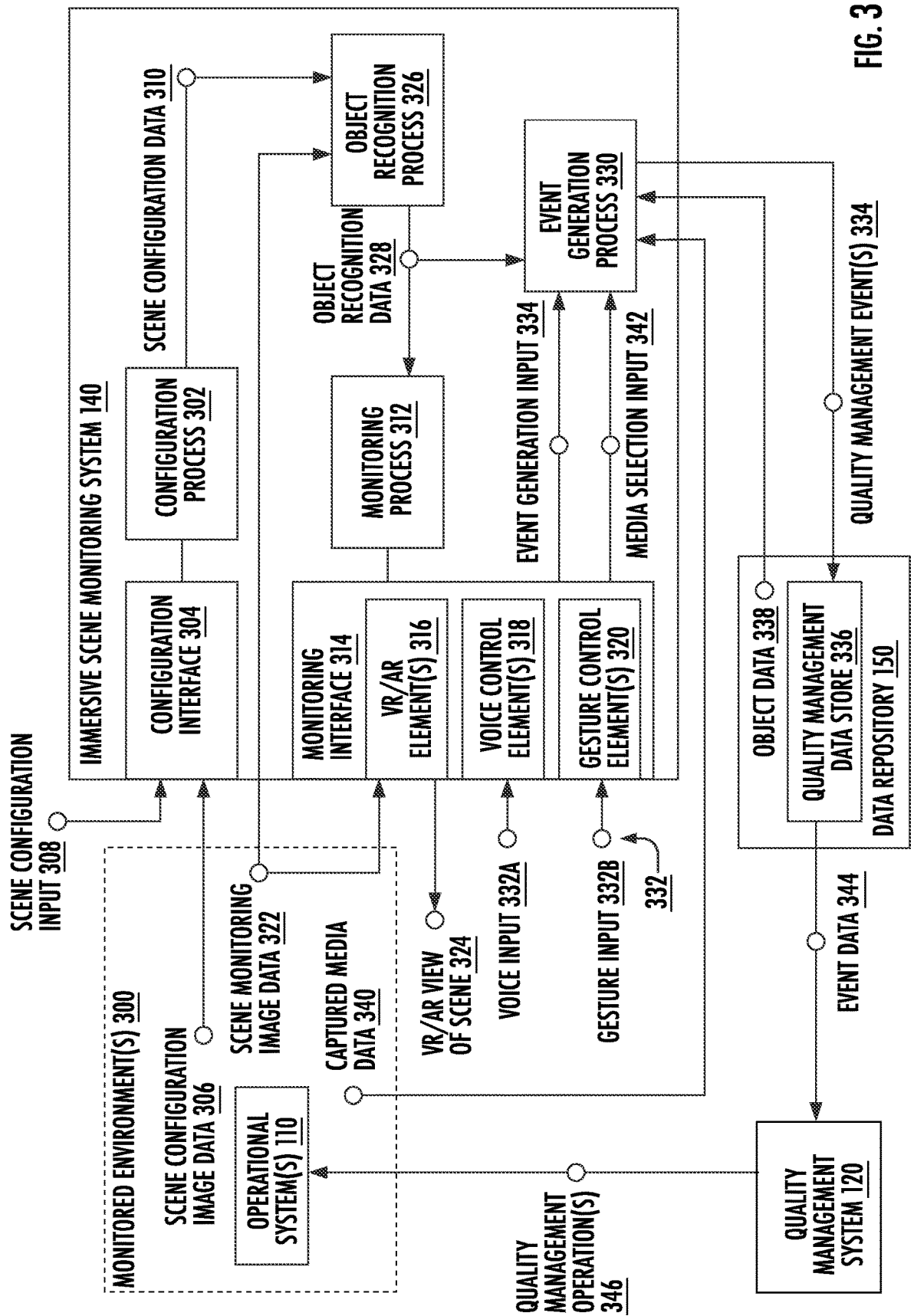
Figure 4:
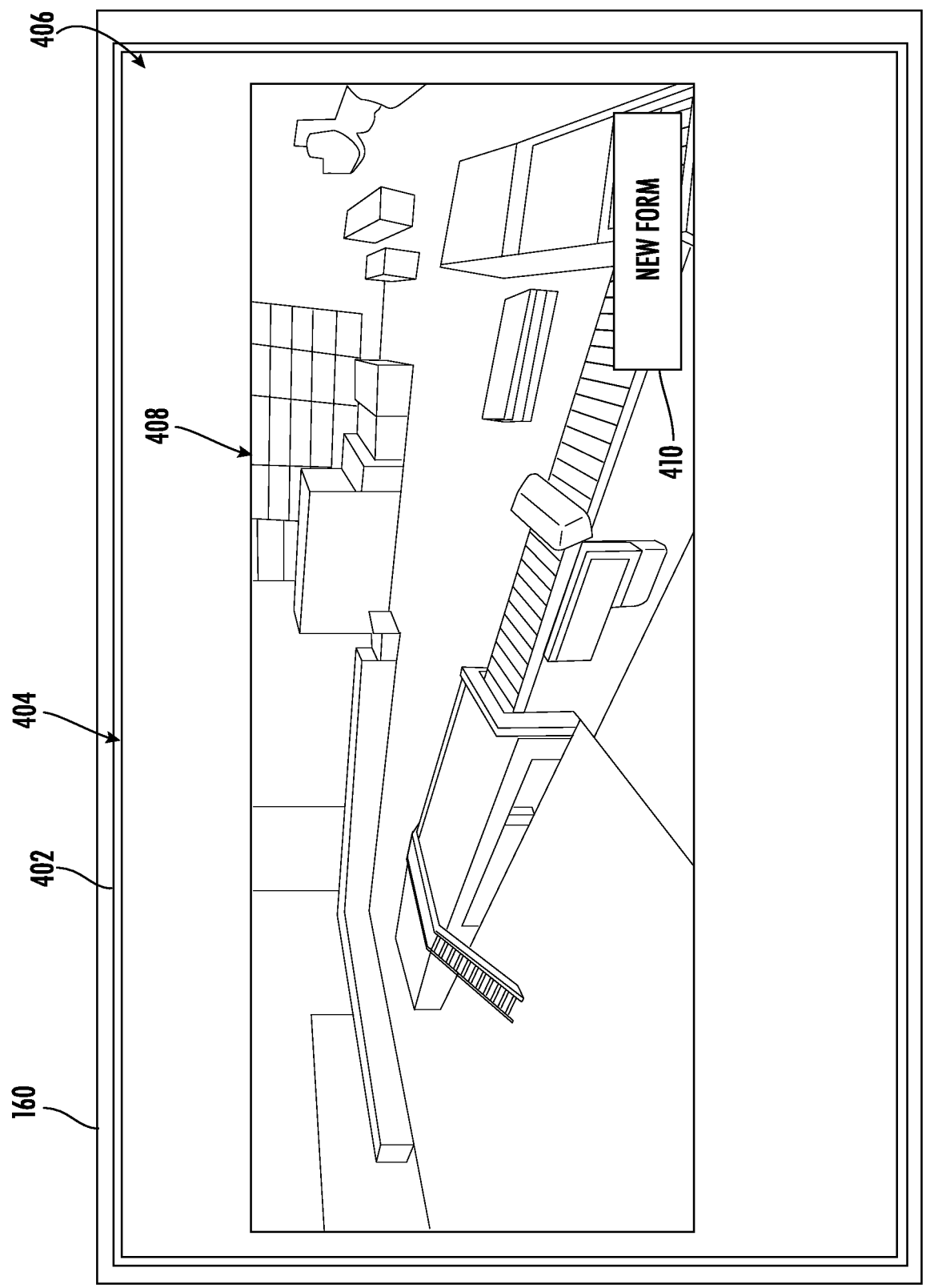
Figure 5:
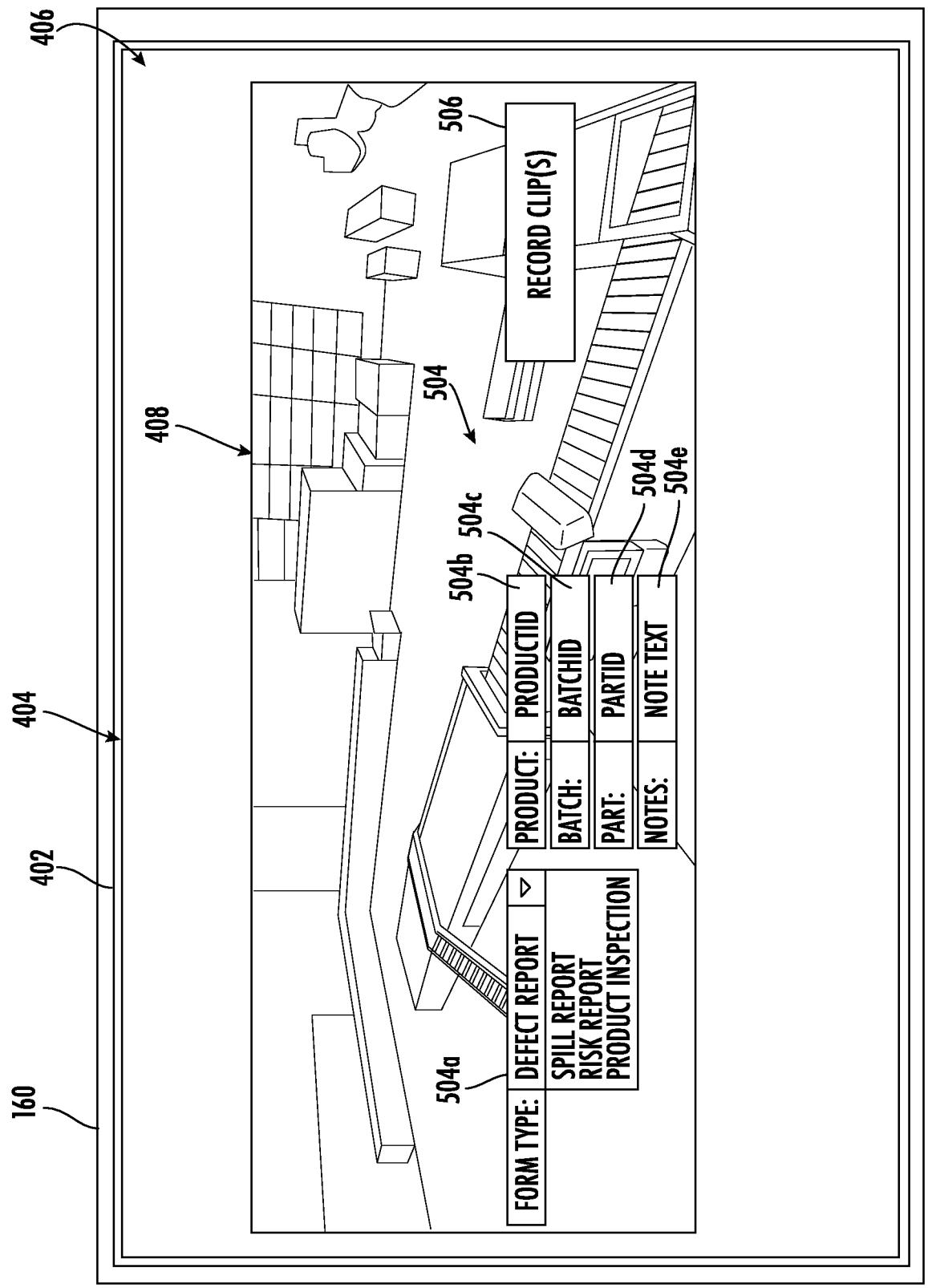
Figure 6:
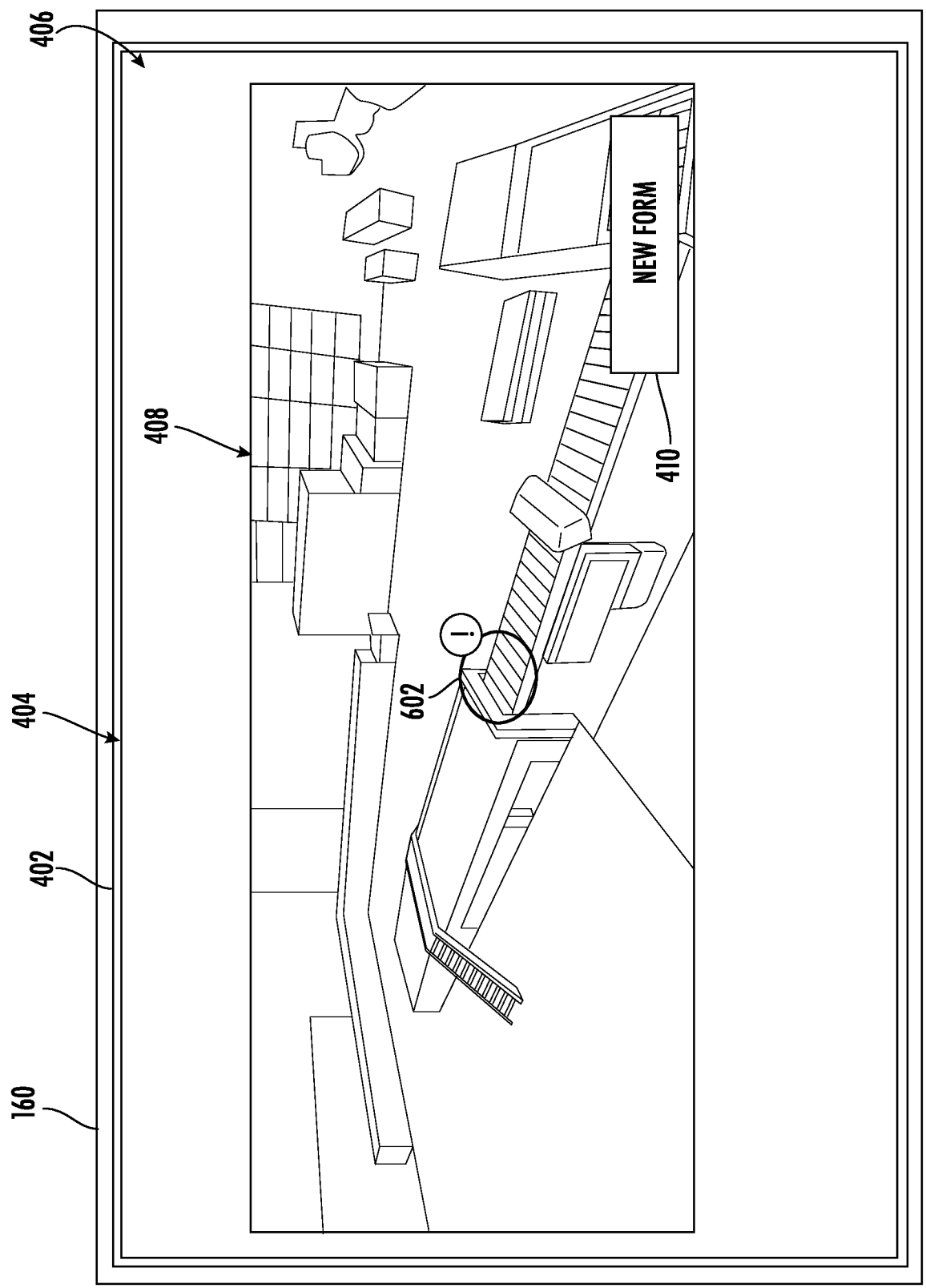
Figure 7:
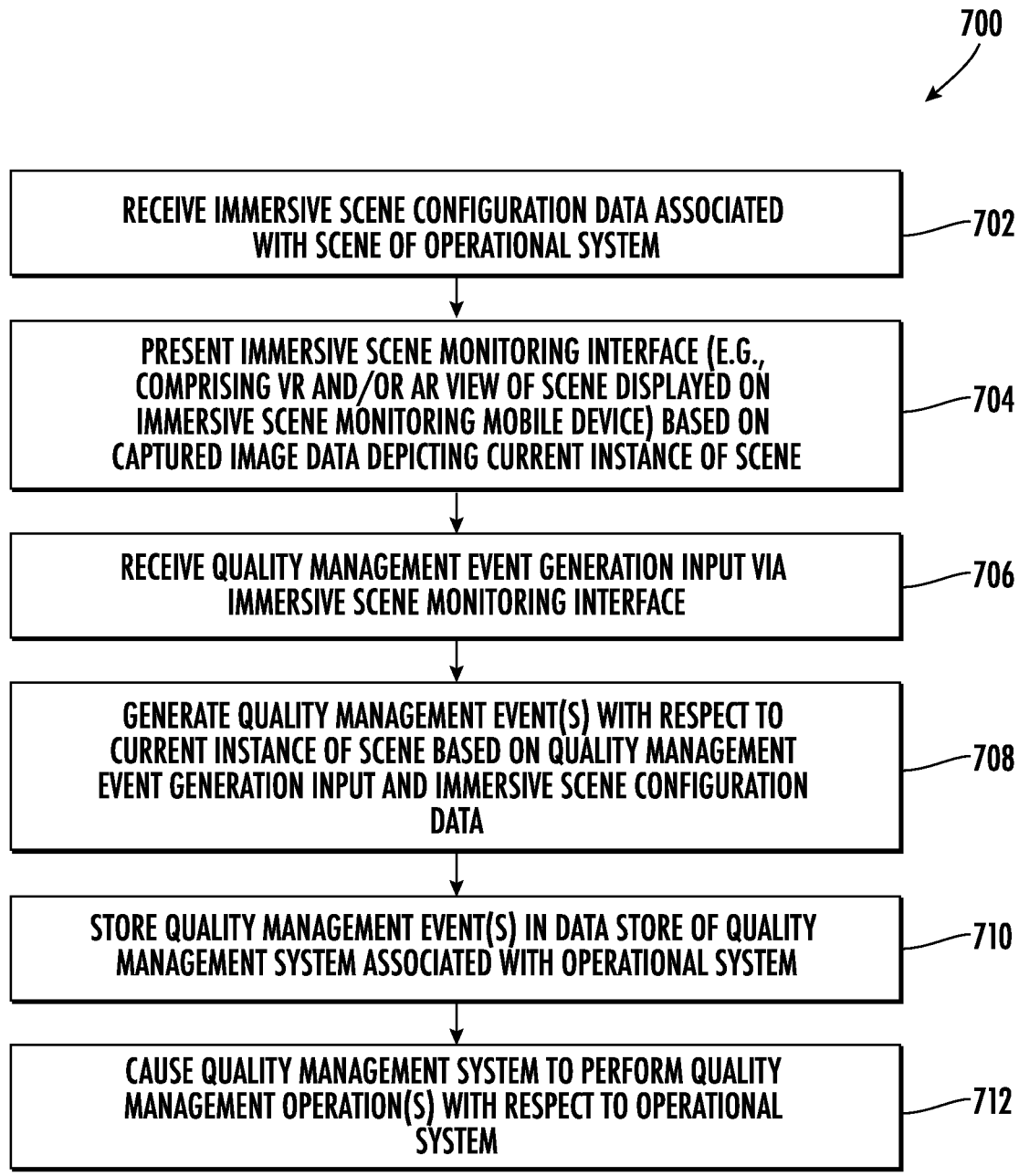
Figure 8:
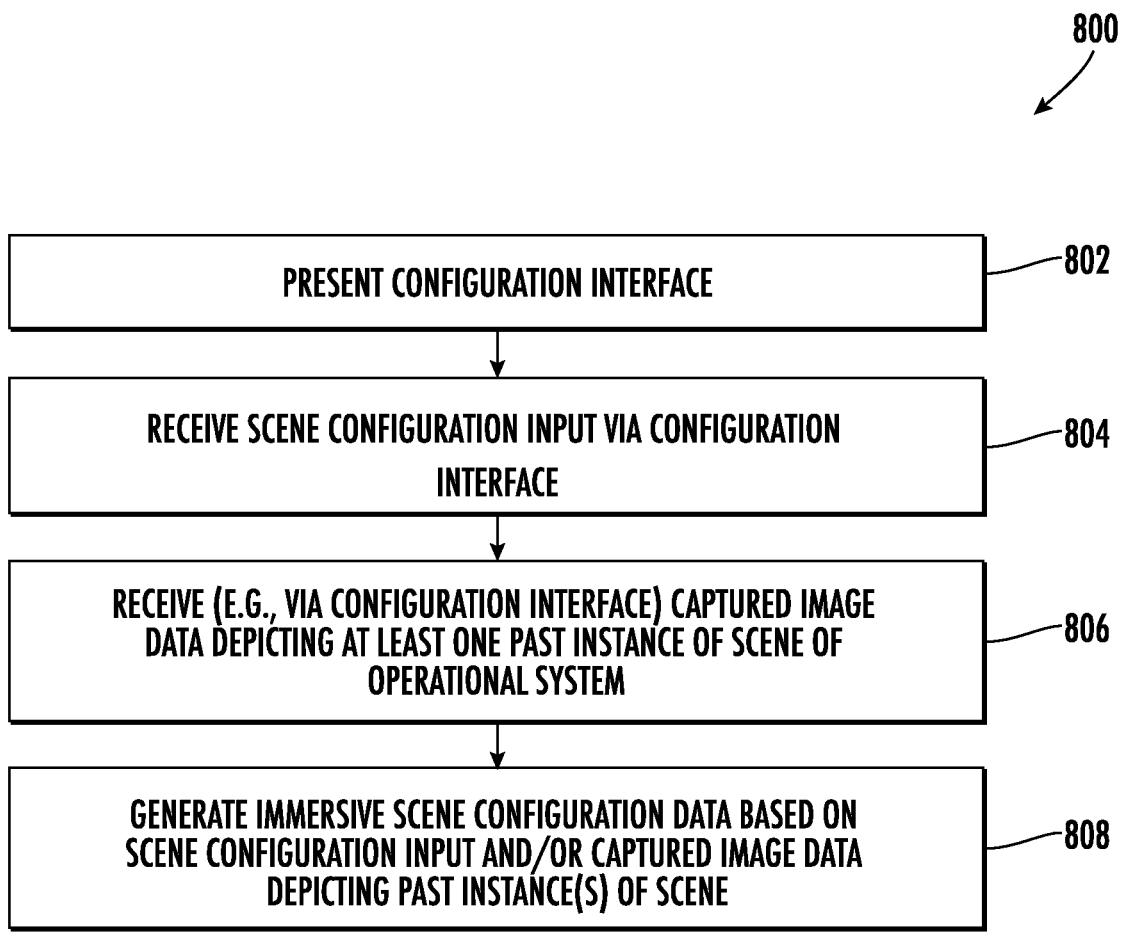

Having thus described the embodiments of the disclosure in general terms, reference now will be made to the accompanying drawings, which are not necessarily drawn to scale, and wherein:

FIG. 1 illustrates an exemplary block diagram of an environment in which embodiments of the present disclosure may operate;

FIG. 2 illustrates an exemplary block diagram of an example apparatus that may be specially configured in accordance with an example embodiment of the present disclosure;

FIG. 3 illustrates an exemplary immersive scene monitoring system, in accordance with at least some example embodiments of the present disclosure;

FIG. 4 illustrates a monitoring view in an active monitoring state presented within an immersive interface, in accordance with at least some example embodiments of the present disclosure;

FIG. 5 illustrates a monitoring view in an event generation input state presented within an immersive interface, in accordance with at least some example embodiments of the present disclosure;

FIG. 6 illustrates a monitoring view in a monitoring and anomaly detection state presented within an immersive interface, in accordance with at least some example embodiments of the present disclosure;

FIG. 7 is a flowchart depicting an example process for presenting an immersive scene monitoring interface and generating quality management events, in accordance with at least some example embodiments of the present disclosure; and FIG. 8 is a flowchart depicting an example process for configuring an immersive scene monitoring system for monitoring of particular scenes, in accordance with at least some example embodiments of the present disclosure.

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

In some exemplary scenarios, enterprises such as businesses or other organizations may produce products of various types via various research, manufacturing, and/or distribution processes associated with production of these products. In many such cases, these enterprises may develop, implement, and/or perform quality management systems, processes, and/or operations with respect to these research, manufacturing, and/or distribution processes with an aim toward ensuring that the quality of the products being produced meet a certain standard at a certain level of consistency. Sometimes, certain aspects of such quality management may even be required by laws and/or regulations. Production of certain types of products in particular, for example, may be subject to a relatively high degree of quality management regulation, including medical devices and pharmaceutical products, to list a few examples. Quality management often involves (if not depends on) collecting data with respect to production operations associated with these products via generation of various types of quality management events comprising various types of data associated with the quality management events.

Quality management software may be used to implement and/or facilitate quality management measures undertaken by enterprises with respect to the production of their products. More particularly, it may be possible for a quality management software system to facilitate the process of logging quality management events and/or collecting required data for quality management purposes. For example, the system may be configured to enable a user to initiate and log into a quality management app executing on a user device (e.g., computer, mobile device, tablet) and manually fill out various types of online forms associated with quality management, including complaint forms, supplier quality management forms, audit forms, risk forms, and/or quality event forms, to list a few examples.

However, in many cases, quality management apps and/or user devices for filling out quality management forms are not configured to be accessible or easily/intuitively operated within a monitored environment (e.g., research environment, manufacturing environment, material handling environment, distribution environment) where the various production operation(s) that are the subject of the monitoring and data collection take place. For example, in one common scenario, a user monitoring a production environment for quality management purposes must leave the monitored environment in order to access the quality management app and/or user device in order to fill out a quality management form arising from an incident or observation that occurred within the monitored environment. This often results in delays in filling out the forms, which can lead to insufficient and/or inaccurate data collection, among other issues.

Moreover, these quality management forms have traditionally been designed to be text-based (e.g., comprising various input fields allowing only text input) and often do not support other types of data collection in connection with quality management events, including images, videos, and/or audio recordings, to list a few examples.

In various embodiments, the presently disclosed immersive scene monitoring system provides an immersive scene monitoring interface configured to address at least the various problems and challenges described above with respect to quality management event generation by, for example, using virtual reality (VR) and/or augmented reality (AR) to provide a more immersive, intuitive, and automated experience for users monitoring production operations and systems for quality management purposes. In one example scenario, each enterprise (e.g., pharmaceutical company and/or manufacturer) may have a different set of products, each corresponding to operational systems and/or environments (e.g., laboratories, manufacturing floors, shipping floors) associated with the production of the various products. In this case, the immersive scene monitoring system can be configured to generate and present an immersive (e.g., VR- and/or AR-based) monitoring interface specific to the particular scenes pertinent to their own various products and processes. Such configuration can account for various differences in objects and/or anomalies that might be present in connection with different production operations and/or systems for different products (e.g., differences in visual features of parts/components for which anomalies would be detected). In one example, a "golden data set" comprising images depicting a particular scene under known normal operating conditions and/or under known anomalous conditions can be generated and stored in association with the particular scene. Upon configuration of the particular scene, a VR device can be used to monitor the particular scene (e.g., supply line) by presenting an immersive depiction of the scene during a period of operation, including possibly a graphical indication of any anomalies present within the monitored scene, along with an intuitive VR/AR quality management form interface for generating quality management events and filling out the corresponding forms with any pertinent data in "virtual space", using various input types including voice commands and/or gesture commands. The interface may be configured to capture media data and select clips or portions of the captured media data containing relevant depictions of the monitored scene to include in the generated quality management events. Moreover, in some embodiments, generation of the quality management events may be automatically performed based on analysis of captured image data depicting the monitored scene.

FIG. 1 illustrates an exemplary block diagram of an environment 100 in which embodiments of the present disclosure may operate. Specifically, FIG. 1 illustrates one or more operational systems 110, an immersive scene monitoring system 140, a quality management system 120, one or more data repositories 150, and one or more user devices 160, all connected to a network 130.

The operational system(s) 110 may refer to any physical equipment, objects, spaces, activities, and/or operations associated with one or more pharmaceutical research, manufacturing, and/or distribution processes and/or one or more production operations comprised thereby or otherwise associated therewith for production of one or more (e.g., pharmaceutical) products. In some embodiments, the operational system(s) 110 may comprise equipment configured to perform the production operation(s), including laboratory equipment, manufacturing equipment, and/or material handling, sorting, and/or distribution equipment. In some embodiments, the operational system(s) 110 may comprise fixtures, tools, and/or other objects configured to be used in performance of the production operation(s). In some embodiments, the operational system(s) 110 may comprise spaces within which the production operation(s) are performed. In some examples, the operational system(s) 110 may be configured to perform the production operation(s) and/or to monitor and/or control various physical aspects of environments in which the production operation(s) are performed. The operational system(s) 110 may comprise one or more objects associated with the production operation(s), including equipment, parts, components, controllers, sensors, actuators, storage and/or reaction vessels, pipes, valves, manual tools, laboratory equipment, fixtures, and/or partially or fully assembled and/or formed instances of the product(s), to list a few examples. The operational system(s) 110 may include automation systems and/or industrial systems (e.g., manufacturing systems, sorting and distribution systems).

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

The one or more data repositories 150 may be configured to receive, store, and/or transmit data. In some embodiments, the one or more data repositories 150 may be configured to store object data and/or metadata associated with one or more enterprises, one or more products produced by the enterprise(s), one or more operational systems 110 associated with production of the product(s), and/or one or more production operations performed by, using, and/or within the operational system(s) 110. In some embodiments, the one or more data repositories 150 may be configured to store data associated with monitoring of scenes associated with the enterprise(s), product(s), operational system(s) 110, and/or production operation(s) and/or generating quality management events in connection with such monitoring, including scene configuration data, object recognition data, and/or quality management events and/or any event data comprised by and/or derived from such events. In various embodiments, some or all of the data stored in the one or more data repositories 150 may be stored in a shared memory system shared between the quality management system 120 and/or the immersive scene monitoring system 140 and/or may be otherwise accessible to the quality management system 120 and/or the immersive scene monitoring system 140.

The one or more user devices 160 may be associated with and/or operated by users of the immersive scene monitoring system 140, the quality management system 120, and/or the operational system(s) 110 associated with the one or more products and/or production of the one or more products. In one example, the operational system(s) 110 associated with the one or more products and/or production thereof may cause data associated with the production of the one or more products to be transmitted to, to be displayed on, and/or to be used to generate data or interface elements displayed on the user devices(s) 160 and/or may cause one or more interfaces (e.g., user interfaces) to be presented via the user device(s) 160, which interface(s) may be configured to receive input comprising and/or used to generate any data associated with the one or more products and/or production thereof. In another example, the quality management system 120 may cause data (e.g., event data) comprised by and/or derived from quality management events to be transmitted to, to be displayed on, and/or to be used to generate data or interface elements displayed on the user devices(s) 160 and/or may cause one or more interfaces (e.g., user interfaces) to be presented via the user device(s) 160, which interface(s) may be configured to receive input comprising and/or used to generate any data associated with performance of quality management operations. In another example, the immersive scene monitoring system 140 may cause data associated with scene configuration, scene monitoring, and/or quality management event generation to be transmitted to, to be displayed on, and/or to be used to generate data or interface elements displayed on the user devices(s) 160 and/or may cause one or more interfaces (e.g., user interfaces) to be presented via the user device(s) 160, which interface(s) may be configured to receive input comprising and/or used to generate any data associated with the scene configuration, scene monitoring, and/or quality management event generation.

In various embodiments, the user device(s) 160 may include immersive scene monitoring mobile devices, which may be configured to present an immersive (e.g., VR- and/or AR based) interface, including possibly capturing image data depicting a scene being monitored and/or configured. Accordingly, the user device(s) 160 may comprise one or more components and/or auxiliary devices specifically associated with implementing the immersive interface, including possibly wearable displays, immersive, three-dimensional, and/or near-eye displays, one or more embedded or external cameras, and/or one or more special input components or devices for receiving input as part of an immersive interface, including gesture tracking components and/or devices and/or audio capture components and/or devices, to list a few examples.

The immersive scene monitoring system 140 may be a computing system or device (e.g., server system) configured via hardware, software, firmware, and/or a combination thereof, to perform scene configuration, scene monitoring, and quality management event generation functionality comprising, for example, presenting a configuration interface, receiving (e.g., via the configuration interface) configuration input and/or scene configuration image data, generating scene configuration data, presenting a monitoring interface, receiving event generation input and/or media selection input via the monitoring interface, generating quality management events, and/or causing performance of quality management operations based on the quality management events.

The quality management system 120 may be a computing system or device (e.g., server system) configured via hardware, software, firmware, and/or a combination thereof, to perform quality management operations with respect to the operational system(s) 110 comprising, for example, presenting interface(s) configured to receive input used in performance of the quality management operations, receiving (e.g., via the presented interface(s)) the input used in performance of the quality management operations, accessing and/or retrieving quality management events and/or any event data comprised by or derived therefrom, and/or performing the quality management operations based on the retrieved event data and/or quality management events. In some embodiments, the quality management system 120 may comprise quality management software including and/or similar to that defined and described above.

While FIG. 1 illustrates certain components as separate, standalone entities communicating over the network 130, various embodiments are not limited to this configuration. In other embodiments, one or more components may be directly connected and/or share hardware or the like.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. Examples of an apparatus 200 may include, but is not limited to, one or more components of the operational system(s) 110, an immersive scene monitoring system 140, a quality management system 120, data repositories 150, and/or user devices 160. The apparatus 200 includes processor 202, memory 204, input/output circuitry 206, communications circuitry 208, and/or configuration circuitry 210, monitoring circuitry 212, event generation circuitry 214, and/or object recognition circuitry 216. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, a device, system, or apparatus, such as apparatus 200 of the operational system(s) 110, an immersive scene monitoring system 140, a quality management system 120, data repositories 150, and/or user devices 160, may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry embodying the memory 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Configuration circuitry 210 may be included in the apparatus 200 (e.g., an apparatus specifically corresponding to the immersive scene monitoring system 140). The configuration circuitry 210 may include hardware, software, firmware, and/or a combination thereof, designed and/or configured to request, receive, process, generate, and transmit data, data structures, control signals, and electronic information for configuring scenes, including performing any of the operations described herein with respect to receiving configuration input, receiving configuration image data, and/or generation scene configuration data.

Monitoring circuitry 212 may be included in the apparatus 200 (e.g., an apparatus specifically corresponding to the immersive scene monitoring system 140). The monitoring circuitry 212 may include hardware, software, firmware, and/or a combination thereof, designed and/or configured to request, receive, process, generate, and transmit data, data structures, control signals, and electronic information for functionality related to monitoring scenes, including performing any of the operations described herein with respect to presenting a monitoring interface (e.g., including a VR and/or AR view of a scene) and/or receiving input via the monitoring interface.

Event generation circuitry 214 may be included in the apparatus 200 (e.g., an apparatus specifically corresponding to the immersive scene monitoring system 140). The event generation circuitry 214 may include hardware, software, firmware, and/or a combination thereof, designed and/or configured to request, receive, process, generate, and transmit data, data structures, control signals, and electronic information for generation of quality management events, including performing any of the operations described herein with respect to quality management events.

Object recognition circuitry 216 may be included in the apparatus 200 (e.g., an apparatus specifically corresponding to the immersive scene monitoring system 140). The object recognition circuitry 216 may include hardware, software, firmware, and/or a combination thereof, designed and/or configured to request, receive, process, generate, and transmit data, data structures, control signals, and electronic information for detecting and/or recognizing objects and/or anomalies in image data, including performing any of the operations described herein with respect to object recognition and/or object recognition data.

In some embodiments, two or more of the sets of circuitries 202-216 are combinable. Alternatively, or additionally, one or more of the sets of circuitry 202-216 perform some or all of the operations and/or functionality described herein as being associated with another circuitry. In some embodiments, two or more of the sets of circuitry 202-216 are combined into a single module embodied in hardware, software, firmware, and/or a combination thereof. For example, in some embodiments, one or more of the sets of circuitry, for example the configuration circuitry 210, may be combined with the processor 202, such that the processor 202 performs one or more of the operations described herein with respect to the configuration circuitry 210.

FIG. 3 is an illustration of an example immersive scene monitoring system 140, in accordance with at least some example embodiments of the present disclosure. Specifically, FIG. 3 includes schematic depictions of the example immersive scene monitoring system 140, including example internal processes and components of the immersive scene monitoring system 140, and/or schematic depictions of the one or more data repositories 150 and the quality management system 120 in communication with the immersive scene monitoring system 140, along with example data objects used by and/or produced by the depicted processes, components, and/or systems. The immersive scene monitoring system 140 and/or apparatuses 200 associated therewith, for example, may be specially configured via hardware, software, firmware, and/or a combination thereof, to perform the various data processing and interactions described with respect to FIG. 3 to present an immersive scene monitoring interface and to generate quality management events using the immersive scene monitoring interface.

In the illustrated example, the immersive scene monitoring system 140 comprises, in some examples, a configuration process 302, a configuration interface 304, a monitoring process 312, a monitoring interface 314, an object recognition process 326, and an event generation process 330. Additionally, the one or more data repositories 150 comprise, in some examples, a quality management data store 336.

In an example scenario, the one or more operational systems 110 may be located, positioned, and/or installed at and/or within a monitored environment 300.

The operational system(s) 110 may be as previously defined and described. For example, the operational system(s) 110 may be associated with one or more pharmaceutical research, manufacturing, and/or distribution processes and/or one or more production operations comprised thereby or otherwise associated therewith. In some embodiments, the operational system(s) 110 may comprise equipment configured to perform the production operation(s), including laboratory equipment, manufacturing equipment, and/or material handling, sorting, and/or distribution equipment. In some embodiments, the operational system(s) 110 may comprise fixtures, tools, and/or other objects configured to be used in performance of the production operation(s). In some embodiments, the operational system(s) 110 may comprise spaces within which the production operation(s) are performed.

The monitored environment 300 may correspond to and/or comprise one or more physical spaces within which the production operation(s) are performed. In some embodiments, the monitored environment 300 may comprise a space where object(s) comprised by the operational system(s) 110 (e.g., equipment, fixtures, tools, and/or other objects) are installed, positioned, located, used, and/or operated. In some embodiments, the monitored environment 300 may correspond to the spaces within which the production operation(s) are performed.

A scene of and/or associated with the operational system(s) 110 may comprise views (e.g., providing or comprising visual representations) of any physical aspect(s) of the operational system(s) 110 and/or monitored environment(s) 300, including views of laboratory, production line, and/or material handling environments (and/or any objects contained therein) associated with the pharmaceutical research, manufacturing, and/or distribution process(es).

In various embodiments, the immersive scene monitoring system 140 may be configured to facilitate monitoring of the operational system(s) 110 within the monitored environments 300 for quality management purposes (e.g., in connection with one or more quality management operations 346 performed with respect to the operational system(s) 110 by the quality management system 120). In some embodiments, the immersive scene monitoring system 140 may be configured to facilitate monitoring of particular scenes of and/or associated with the operational system(s) 110 and/or the monitored environment 300, which particular scenes may correspond to instances of performance of the production operation(s) by, using, and/or within the operational system(s) 110. For example, the immersive scene monitoring system 140 may be configured to facilitate monitoring of the operational system(s) 110 by providing views of the particular scenes, which views may determine and/or aid in determining generation of quality management events 334 and/or performance of quality management operation(s) 346 with respect to the operational system(s) 110 and/or monitored environment(s) 300. In some embodiments, the immersive scene monitoring system 140 may be configured to provide the views in the form of the monitoring interface 314, which may comprise (e.g., may be rendered to include and/or present) and/or may be generated based at least in part on captured image data depicting a current instance of a scene of the operational system(s) 110.

In one example, in some embodiments, the monitoring interface 314 may be configured to provide a VR and/or an AR view of a scene 324 of the operational system(s) 110. More particularly, the monitoring interface 314 may comprise one or more VR and/or AR elements 316 configured to perform various operations associated with generation of and/or presentation of the VR/AR view 324. For example, one or more of the VR/AR element(s) 316 may be configured to receive scene monitoring image data 322. In another example, one or more of the VR/AR element(s) 316 may be configured to cause capturing of the scene monitoring image data 322 (e.g., by one or more cameras). In another example, one or more of the VR/AR element(s) 316 may be configured to cause display of visual aspects of the monitoring interface 314 (e.g., the VR/AR view 324) on a display, for example, based at least in part on and/or including the scene monitoring image data 322.

In various embodiments, the scene monitoring image data 322 may comprise captured image data depicting a current instance of a scene of the operational system(s) 110. In one example, the scene monitoring image data 322 may be embodied in a continuous stream of captured video data depicting the scene during a period of time corresponding to the current instance of the scene. In one example, the scene monitoring image data 322 may comprise real-time image data depicting the scene, which may, for example, refer to image data captured and presented (e.g., as part of a view of the scene) at roughly the same time and/or practically without delay between the capturing of the image data and presentation of the view. The captured image data of the scene monitoring image data 322 may depict the scene of the operational system(s) 110 by virtue of comprising depictions of any objects and/or spaces of interest associated with the operational system(s) 110 and/or the monitored environment(s) 300, including captured depictions of any equipment, fixtures, tools, and/or other objects of the operational system(s) 110, captured depictions of any spaces within which the production operation(s) are performed, and/or captured depictions of performance of the production operation(s), to list a few examples. In some embodiments, the scene monitoring image data 322 may be captured by one or more cameras, which may be positioned at the scene depicted in the image data (e.g., within and/or in visual range of the monitored environment(s) 300 and/or operational system(s) 110). In some embodiments, the scene monitoring image data 322 may comprise image data suitable for use in generating and/or rendering a VR and/or AR representation of the scene.

In various embodiments, the VR/AR view 324 may be embodied in a rendered VR and/or AR representation of the scene. In one example, the VR/AR view 324 may be embodied in a simulation of a three-dimensional environment (e.g., corresponding to the scene depicted in the scene monitoring image data 322 and generated based on the scene monitoring image data 322) rendered via a three-dimensional display, a stereoscopic display, a holographic display, a light field display, and/or any other type of VR display configured to convey depth and/or present immersive simulations of a three-dimensional environment. Additionally or alternatively, the VR/AR view 324 may be embodied in a depiction of a real-world environment (e.g., corresponding to the scene depicted in the scene monitoring image data 322 and generated based on the scene monitoring image data 322) that is rendered along with computer-generated graphical content, such as graphical elements overlaid over the depiction of the real-world environment, such that an augmented view of the real-world environment is provided. In some embodiments, the VR/AR view 324 provided by the immersive scene monitoring system 140 may combine features of both VR and AR.

In various embodiments, the VR/AR view 324 may be presented in conjunction with an immersive scene monitoring mobile device (e.g., of the user devices 160). For example, the VR/AR view 324 may be rendered on a display that is part of the immersive scene monitoring mobile device. In some embodiments, the immersive scene monitoring mobile device may be embodied in a wearable device such as, for example, a VR headset comprising a near-eye and/or stereoscopic display or AR glasses comprising a heads-up display, optical head-mounted display, and/or near-eye display. In some embodiments, the immersive scene monitoring mobile device may be embodied in a commodity mobile computing device such as a tablet or a smart phone comprising a touchscreen display. Additionally or alternatively, the immersive scene monitoring mobile device may comprise one or more embedded cameras, which may capture and/or cause generation of the scene monitoring image data 322. Additionally or alternatively, the immersive scene monitoring mobile device may be configured to communicate with one or more external cameras that are external with respect to the immersive scene monitoring mobile device and are positioned at the scene, which external camera(s) may capture the scene monitoring image data 322, cause generation of the scene monitoring image data 322 based on images captured by the external camera(s), and/or transmit the scene monitoring image data 322 and/or images captured by the external camera(s) to the immersive scene monitoring mobile device. In some embodiments, the immersive scene monitoring mobile device may comprise one or more pose tracking elements configured to detect a pose (e.g., position, orientation) of the immersive scene monitoring mobile device and/or one or more position tracking elements configured to detect a current spatial position and/or movement of the immersive scene monitoring mobile device, and the VR/AR view 324 provided by the immersive scene monitoring system 140 may be generated and/or rendered based at least in part on the detected pose, position, and/or movement.

In various embodiments, the monitoring process 312 of the immersive scene monitoring system 140 may be configured to generate and/or present the monitoring interface 314, which may be configured to cause display of the VR/AR view 324 as well as to receive input 332 (e.g., from and/or based on input received and/or detected via the user device(s) 160) associated with the quality management event(s) 334 to be generated by the immersive scene monitoring system 140.

In some embodiments, the monitoring interface 314 presented by the monitoring process 312 may comprise one or more voice control element(s) 318 configured to receive voice input 332a. In one example, one or more of the voice control element(s) 318 may be configured to receive audio data depicting captured sound corresponding to the voice input 332a and/or including recognizable voice commands (e.g., spoken by a user of the immersive scene monitoring mobile device). In another example, one or more of the voice control element(s) 318 may be configured to monitor for and/or cause capturing and/or recording of the captured sound (e.g., via one or more microphones of the immersive scene monitoring mobile device and/or otherwise associated with the immersive scene monitoring system 140) and/or generation of the audio data based at least in part on the captured sound. In another example, one or more of the voice control element(s) 318 may be configured to process the audio data and/or the captured sound in order to detect the recognizable voice commands depicted in the audio data and/or included in the captured sound and/or to translate the audio data and/or captured sound into voice command data interpretable by the immersive scene monitoring system 140 and/or its various internal processes such as the monitoring process 312 and/or the event generation process 330.

In some embodiments, the monitoring interface 314 presented by the monitoring process 312 may comprise one or more gesture control element(s) 320 configured to receive gesture input 332b. In one example, one or more of the gesture control element(s) 318 may be configured to receive gesture data comprising detected movements and/or gestures (e.g., of a user) corresponding to the gesture input 332b and/or including recognizable gesture commands (e.g., performed by a user of the immersive scene monitoring mobile device). In another example, one or more of the gesture control element(s) 320 may be configured to monitor for and/or cause capturing and/or detection of the detected movements and/or gestures (e.g., via one or more gesture input components of and/or gesture input devices associated with the immersive scene monitoring mobile device) and/or generation of the gesture data based at least in part on the detected and/or captured movements and/or gestures. In another example, one or more of the gesture control element(s) 320 may be configured to process the gesture data in order to detect the recognizable gesture commands indicated in the gesture data and/or to translate the gesture data into gesture command data interpretable by the immersive scene monitoring system 140 and/or its various internal processes such as the monitoring process 312 and/or the event generation process 330. In some embodiments, the gesture input 332b may be received (and/or the recognized gestures and/or movements may be detected) via one or more gesture input devices and/or components (e.g., of the immersive scene monitoring mobile device), including motion tracking devices and/or components, optical tracking devices and/or components, and/or hand or finger motion tracking devices and/or components (e.g., wired gloves, datagloves, cybergloves), to list a few examples.

In some embodiments, the monitoring process 312 may be configured to cause display of the VR/AR view 324 as part of a graphical user interface (GUI) rendered on a display (e.g., of the immersive scene monitoring mobile device), the GUI comprising one or more interactable graphical elements configured to prompt interactions (e.g., via input devices and/or components of computing devices such as touchscreen displays) and receive any input represented by such interactions.

In various example scenarios, the input 332 received via the monitoring interface 314 (including, for example, the voice input 332a, the gesture input 332b, and/or any input received via interactable GUI elements) may correspond to various types of input used by the immersive scene monitoring system 140 to perform various operations, including any input used by the monitoring process 312 to update the presentation and/or display of the monitoring interface 314 (and/or VR/AR view 324 provided thereby) and/or any input (e.g., event generation input 334, media selection input 342) used by the event generation process 330 to generate the quality management event(s) 334, to list a few examples.

In some embodiments, in one example scenario, a user operating and/or wearing an immersive scene monitoring mobile device configured to display the monitoring interface 314 may be present at and/or within the monitored environment(s) 300 during a period of performance of the production operation(s) by and/or within the operational system(s) 110 and/or monitored environment(s) 300, and the immersive scene monitoring mobile device may display the VR/AR view 324 of a current instance of the scene corresponding to the period of performance of the production operation(s), the displayed VR/AR view 324 being a real-time view of the scene and comprising and/or being based at least in part on the scene monitoring image data 322 captured during the period of performance of the production operation(s) and/or depicting various objects and/or spaces associated with the performance of the production operation(s). In one example, the immersive scene monitoring system 140 may be configured to continuously update the monitoring interface 314 and/or the VR/AR view 324 provided thereby based at least in part on the scene monitoring image data 322 (e.g., to include the most current images of a real-time video stream of the scene monitoring image data 322) and/or based at least in part on a currently detected pose, position, and/or movement of the immersive scene monitoring mobile device, among other examples. Input may be received via the monitoring interface 314 (e.g., voice input 332a, gesture input 322, any GUI input) from the user operating and/or wearing the immersive scene monitoring mobile device with respect to the VR/AR view 324 of the scene, and this input may be used by the immersive scene monitoring system 140 to generate quality management event(s) 334 with respect to (and/or referencing) the corresponding period of performance of the production operation(s) and/or any products and/or processes associated therewith.

In various embodiments, the event generation process 330 of the immersive scene monitoring system 140 may be configured to receive various types of input 332 (e.g., as previously described) via the monitoring interface 314 (and/or via the monitoring process 312) and to generate the quality management event(s) 334 based at least in part on the input 322. More particularly, the event generation process 330 may be configured to receive event generation input 334 and/or media selection input 342 via the monitoring interface 314 and to generate the quality management event(s) 334 based at least in part on the event generation input 334 and/or the media selection input 342. In some embodiments, the event generation process 330 may be configured to store the quality management event(s) 334 in a data store associated with the quality management system 120, the operational system(s) 110, and/or the immersive scene monitoring system 140, such as the quality management data store 336 stored in the one or more data repositories 150. In some embodiments, the quality management data store 336 may be a data store of the quality management system 120, which quality management system 120 may be associated with the operational system(s) 110, for example, by virtue of being configured to perform, facilitate, and/or cause performance of quality management operation(s) 346 with respect to the operational system(s) 110.

In some embodiments, one or more of the quality management event(s) 334 may correspond to and/or represent a situation, quality event, status, report, need for an evaluation, test, inspection, and/or audit (and/or a result thereof), risk factor, incident, accident, problem, potential problem, defect, process flaw, operating condition, and/or required disclosure, to list a few examples, associated with the operational system(s) 110, the monitored environment 300, and/or performance of any production operation(s) by, using, and/or within the operational system(s) 110. Each of the quality management event(s) 334 may correspond to and/or represent data structures or objects (of various types) comprising data to be stored or logged in a quality management context (e.g., for performance of quality management operations), with each type of event being associated with a set of attributes, for which corresponding values may be determined and/or included in the data comprised by the event.

In some embodiments, the immersive scene monitoring system 140 may be configured to facilitate generation of the quality management event(s) 334 using the monitoring interface 314. In one example, each of the quality management event(s) 334 may correspond to a particular form to be filled out in connection with logging of the event, and the data comprised by a particular event may be determined from a corresponding instance of the form. In some embodiments, the monitoring process 312 may be configured to generate and/or present the monitoring interface 314 such that the monitoring interface 314 may prompt for particular input 332 comprising and/or indicating values corresponding to particular attributes (e.g., from the corresponding form), which particular input 332 and/or particular attributes may be determined based at least in part on a selected event type for the quality management event(s) 334, which selected event type may also be received as part of the input 332 received via the monitoring interface 314.

In one example scenario, a user operating and/or wearing an immersive scene monitoring mobile device may use the immersive scene monitoring mobile device to monitor the operational system(s) 110, monitored environment(s) 300, and/or performance of any associated production operation(s). More particularly, the immersive scene monitoring system 140 may be configured to present the monitoring interface 314 (e.g., including the VR/AR view 324 of the scene), to receive input 332 indicative of a selected event type to be generated (e.g., which input may be provided by the user in response to the user determining based on the VR/AR view 324 that a particular event of the selected event type should be generated) with respect to the current scene, and to prompt for further input 332 (e.g., corresponding to the event generation input 334 and/or the media selection input 342) based on and/or specific to the selected event type.

In various embodiments, the event generation input 334 may comprise and/or be indicative of any data that can be used by the event generation process 330 to generate the quality management event(s) 334, including determining and/or generating values corresponding to one or more attributes of the quality management event(s) 334 and/or capturing, retrieving, and/or otherwise obtaining any data to include as part of the quality management event(s) 334, to list a few examples. In one example, the event generation input 334 may comprise any type of input detected and/or received via the monitoring interface 314 and/or the immersive scene monitoring mobile device on which the monitoring interface 314 is displayed, including voice commands and/or voice command data (e.g., included in and/or derived from the voice input 332a) and/or recognized gestures and/or gesture command data (e.g., included in and/or derived from the gesture input 332b), to list a few examples. In another example, the event generation input 334 may comprise input indicative of selected event types of the quality management event(s) 334 to be generated and/or input indicative of one or more values corresponding to one or more attributes associated with quality management event(s) 334 to be generated, to list a few examples.

In some embodiments, the event generation process 330 may be configured to generate the quality management event(s) 334 to comprise captured media data 340 representing selected clips or portions of captured and/or recorded media depicting one or more aspects of the current instance of the scene. In one example, the captured media data 340 may comprise image data (e.g., representing selected still images and/or selected video segments) and/or audio data (e.g., representing selected audio segments). In another example, the captured media data 340 may comprise a portion of the scene monitoring image data 322 included in and/or used to generate the VR/AR view 324 of the scene. The monitoring process 312 may be configured to generate and/or update the monitoring interface 314 to prompt for and/or receive (e.g., via interactable elements of the monitoring interface 314) the media selection input 342 indicative of selected media clips (e.g., corresponding to the captured media data 340 and/or portions thereof), and the event generation process 330 may be configured to generate the quality management event(s) 334 based at least in part on the media selection input 342 (e.g., by generating the quality management event(s) 334 to include the captured media data 340 corresponding to the selected media clips indicated by the media selection input 342).

In various embodiments, the immersive scene monitoring system 140 may be configured to present the monitoring interface 314 and/or to generate the quality management event(s) 334 based at least in part on objects recognized (e.g., via the object recognition process 326) from depictions of the objects within image data depicting the scene of the operational system(s) 110 and/or the monitored environment 300.

More particularly, in some embodiments, the configuration process 302 of the immersive scene monitoring system 140 may be configured to present the configuration interface 304, which may be configured to receive input (e.g., from and/or based on input received and/or detected via the user device(s) 160) associated with one or more operational system(s) 110 and/or monitored environment(s) 300 subject to monitoring and generation of quality management event(s) 334, including, for example, scene configuration input 308 and scene configuration image data 322. For example, the configuration process 302 may be configured to present the configuration interface 304 within a GUI rendered on one or more displays of the user device(s) 160, the configuration interface 304 comprising one or more interactable elements configured to receive input and/or selections (e.g., of the scene configuration input 308). In another example, possibly in conjunction with presentation of the configuration interface 304 for receiving the scene configuration input 308, the configuration process 302 may receive (e.g., via the configuration interface 304) captured image data depicting the scene (e.g., of the scene configuration image data 306). In various embodiments, the configuration process 302 may be configured to generate scene configuration data 310 based at least in part on the scene configuration input 308 and/or the scene configuration image data 306, which scene configuration data 310 may be used, for example, to recognize objects (e.g., via the object recognition process 326) from depictions of the objects within image data depicting the scene of the operational system(s) 110 and/or the monitored environment 300.

In various embodiments, the scene configuration image data 306 may comprise captured image data depicting at least one past instance of a scene of the operational system(s) 110 (relative to the current instance of the scene depicted in the captured image data of the scene monitoring image data 322). For example, the process of configuration of the scene (to which the scene configuration image data 306 may pertain and during which the scene configuration image data 306 may be captured) may occur at one or more instances of time preceding the instance(s) of time at which the process of monitoring of the scene (to which the scene monitoring image data 322 may pertain and during which the scene monitoring image data 322 may be captured). Moreover, the captured image data depicting the at least one past instance of the scene (e.g., of the scene configuration image data 306) may comprise image data depicting the scene under known normal operating conditions and/or under known anomalous operating conditions. In this way, for example, the scene configuration image data 306 for a particular scene may be used as part of a "golden data set" associated with the particular scene in order to recognize objects and/or detect anomalies depicted in subsequently captured image data depicting the particular scene. In one example, the scene configuration image data 306 may be embodied in one or more continuous streams of captured video data and/or one or more still images depicting the scene during period(s) of time corresponding to the at least one past instance of the scene. In another example, the scene configuration image data 306 may be embodied in a series of images depicting particular objects and/or spaces within the scene (e.g., equipment of the operational system(s) 110 and/or components thereof, fixtures and/or tools of the operational system(s) 110 and/or monitored environment(s) 300, spaces associated with performance of the production operation(s) and/or containing the equipment, fixtures, and/or tools) from various points of view.

Similar to that of the scene monitoring image data 322, the captured image data of the scene configuration image data 306 may depict the scene of the operational system(s) 110 by virtue of comprising depictions of any objects and/or spaces of interest associated with the operational system(s) 110 and/or the monitored environment(s) 300, including captured depictions of any equipment, fixtures, tools, and/or other objects of the operational system(s) 110, captured depictions of any spaces within which the production operation(s) are performed, and/or captured depictions of performance of the production operation(s), to list a few examples. In some embodiments, the scene configuration image data 306 may be captured by one or more cameras, which may be positioned at the scene depicted in the image data (e.g., within and/or in visual range of the monitored environment(s) 300 and/or operational system(s) 110). In some embodiments, the scene configuration image data 306 may comprise image data suitable for use in generating and/or rendering a VR and/or AR representation of the scene, and the configuration process 302 may be configured to present the configuration interface 304 in a similar manner as the monitoring interface 314, including providing a VR/AR view of the scene based on the captured image data in parallel with ingesting and processing the captured image data (e.g., of the scene configuration image data 306) to generate the scene configuration data 310. In various embodiments, the scene configuration image data 306 may be captured by one or more cameras, which may be external camera(s) in communication with the user device(s) 160 on which the configuration interface 304 is presented, embedded camera(s) of the user device(s) 160 on which the configuration interface 304 is presented, and/or camera(s) of the immersive scene monitoring mobile device, to list a few examples.

In various embodiments, the scene configuration input 308 may comprise any input and/or selections based upon which the scene configuration data 310 may be determined, defined, and/or generated. More particularly, in some embodiments, the scene configuration input 308 associated with a particular scene may comprise data indicative of input and/or selections identifying the particular scene, providing contextual data for the particular scene (e.g., associating the particular scene with a particular product and/or type thereof, a particular production operation and/or type thereof, a particular operational system 110 and/or component and/or type thereof, particular quality management operations and/or objectives), and/or cross-referencing various items of data associated with the particular scene with other items of data and/or data sets (e.g., of object data 338, which may be stored in the one or more data repositories 150) associated with the operational system(s) 110, monitored environment(s) 300, product, production operation(s), and/or enterprise with which the particular scene is associated. In some embodiments, the scene configuration input 308 may comprise one or more items of data referencing and/or associated with one or more portions of one or more images comprised by the scene configuration image data 306, such as labels, tags, and/or other contextual data and/or metadata associated with, delineating, characterizing, and/or identifying various objects and/or spaces depicted in the image(s) comprised by the scene configuration image data 306.

In various embodiments, the scene configuration data 310 may comprise any data comprised by and/or derived from the scene configuration input 308 and/or the scene configuration image data 306 (e.g., as previously defined and described). In some embodiments, the configuration process 302 may be configured to generate the scene configuration data 310 to comprise the scene configuration input 308 combined with and/or cross-referenced with the scene configuration image data 306. In one example, the scene configuration input 308 received with respect to a particular scene may be combined and/or cross-referenced with the scene configuration image data 306 received with respect to that particular scene to generate a labeled image data set (e.g., comprised by the scene configuration data 310) specific to the particular scene, which labeled image data set may be used (e.g., by the object recognition process 326) to recognize objects and/or detect anomalies depicted in subsequently captured image data for the particular scene.

In various embodiments, the configuration process 302 may be configured to generate and/or present the configuration interface 304, to receive the scene configuration input 308 and/or scene configuration image data 306, and/or to generate the scene configuration data 310 with respect to any quantity of scenes pertaining to any quantity of operational system(s) 110, monitored environment(s) 300, production operations, products, and/or enterprises. In some embodiments and/or scenarios, the configuration process 302 may be configured to generate a plurality of instances of the scene configuration data 310, each instance of the scene configuration data 310 being specific to and associated with a particular scene to be subsequently monitored (e.g., via the monitoring process 312). For the purposes of illustration, in one example scenario, the immersive scene monitoring system 140 may be configured to perform scene configuration and monitoring functionality (e.g., as previously described) with respect to a plurality of enterprises (e.g., each independently subscribed with respect to the immersive scene monitoring system 140), a plurality of products produced by each of the plurality of enterprises, a plurality of operational systems 110, monitored environments 300, and/or production operations associated with production of each of the plurality of products, and/or a plurality of scenes pertaining to each of the plurality of operational systems 110, monitored environments 300, and/or production operations, and, accordingly, the immersive scene monitoring system 140 may be configured to generate, store, and/or maintain a discrete instance or set of scene configuration data 310 specific to each particular scene for each operational system 110, monitored environment 300, and/or production operation corresponding to each product produced by each enterprise. In this way, for example, each enterprise can configure the VR/AR monitoring interface to work specifically with respect to the particular scenes relevant to the enterprise's own products, processes, systems, and/or environments.

In various embodiments, the object recognition process 326 of the immersive scene monitoring system 140 may be configured to generate object recognition data 328 associated with a current instance of a particular scene based at least in part on the scene monitoring image data 322 corresponding to the current instance of the particular scene and on the scene configuration data 310 corresponding to the particular scene. In one example, the object recognition process 326 may be configured to detect and/or identify recognizable objects and/or anomalies (e.g., from a set of recognizable objects and/or anomalies defined in the scene configuration data 310) depicted in the scene monitoring image data 322 by analyzing the scene monitoring image data 322 based at least in part on the scene configuration data 310 (e.g., using one or more object recognition algorithms), to generate the object recognition data 328 to comprise data and/or metadata defining, identifying, characterizing, and/or referencing any of the detected and/or identified recognizable objects, and/or to provide the object recognition data 328 to the monitoring process 312 and/or the event generation process 330. In some embodiments, the object recognition process 326 may comprise one or more machine learning models, which may be trained on a training data set derived from, comprised by, and/or comprising the scene configuration data 310 to detect and/or identify the recognizable objects and/or anomalies with respect to one or more particular scenes.

In various embodiments, objects detected and/or identified (e.g., in the object recognition data 328 via the object recognition process 326 and/or in the scene configuration data 310) may comprise any objects that may be defined with respect to a given scene as a recognizable object that could possibly be present in the given scene (e.g., appearing in image data depicting the scene), including pallets, containers, equipment, parts, and/or any other objects comprised by and/or associated with the operational system(s) 110 and/or monitored environment(s) 300 as defined and described above, to list a few examples.

Moreover, in various embodiments, anomalies detected and/or identified (e.g., in the object recognition data 328 via the object recognition process 326 and/or in the scene configuration data 310) may comprise any anomalies that may be defined with respect to a given scene as a recognizable anomaly that could possibly be present in the given scene (e.g., appearing in image data depicting the scene as an anomalous object or condition and/or as a detected deviation with respect to a normal or expected object or condition), including manufacturing defects (e.g., defects in a diaphragm valve or collapsible tube), chemical spills, objects (e.g., bottles) arranged in unexpected positions (e.g., tilted at unexpected angles), objects having unexpected or anomalous colors or other visual characteristics, supply storage areas (e.g., shelves) having insufficient quantities or amounts of supplies, unexpected or anomalous movements or motion, and/or fully or partially assembled or formed instances of the product(s) having unexpected or anomalous visual features, to list a few examples.

In some embodiments, the monitoring process 312 may be configured to generate and/or present the monitoring interface 314 based at least in part on the object recognition data 328, namely, for example, based at least in part on any anomalies detected in the corresponding scene monitoring image data 322 as indicated in the object recognition data 328. For example, the VR/AR view 324 of the current instance of the scene may be rendered with one or more graphical elements in particular positions, having particular visual characteristics, and/or enabling and/or prompting for particular interactions (e.g., via the monitoring interface 314) based at least in part on one or more detected anomalies, including graphical elements visually indicating, emphasizing, and/or highlighting regions of images of the VR/AR view 324 in which the one or more detected anomalies are depicted, graphical elements comprising rendered text (e.g., containing suggestions and/or other information) specific to the one or more detected anomalies, and/or interactable graphical elements prompting for and/or enabling particular interactions with the monitoring interface 314 specific to the one or more detected anomalies, to list a few examples.

In some embodiments, the event generation process 330 may be configured to generate the quality management event(s) 334 based at least in part on the object recognition data 328, namely, for example, based at least in part on any objects detected in the corresponding scene monitoring image data 322 as indicated in the object recognition data 328. For example, the event generation process 330 may be configured to retrieve (e.g., from the one or more data repositories 150) stored object data 338 associated with one or more detected objects and to automatically populate one or more input fields corresponding to one or more attributes associated with the quality management event(s) 334 to be generated based at least in part on the retrieved object data 338. Additionally or alternatively, the monitoring process 312 may be configured to generate and/or present the monitoring interface 314 based at least in part on the stored object data 338 corresponding to the one or more detected objects, for example, by rendering the one or more input fields corresponding to the one or more attributes associated with the quality management event(s) 334 with automatically populated values based on the stored object data 338.

In some example scenarios and/or in some embodiments, the quality management system 120 may be configured to retrieve event data 344 (e.g., comprising one or more of the quality management event(s) 334) from the quality management data store 336 and to perform one or more quality management operation(s) 346 with respect to the operational system(s) 110 and/or monitored environment(s) 300 based at least in part on the event data 344. For example, based at least in part on the event data 344 and/or the quality management event(s) 334, the quality management system 120 may be configured to update a GUI of the quality management system 120 (e.g., to display the event data 344 and/or data derived therefrom), generate and/or transmit alerts, generate reports, and/or perform automated operations (e.g., generating and submitting orders, scheduling service and/or inspection, generating related quality management events, performing automatic service and/or diagnostic operations), to list a few examples.

In some embodiments, in addition to or alternative to presenting the monitoring interface 314, the immersive scene monitoring system 140 may be configured to automatically monitor the scene and generate the quality management event(s) 334 based at least in part on the scene monitoring image data 322, scene configuration data 310, and/or object recognition data 328. For example, the immersive scene monitoring system 140 may be configured to automatically analyze the scene monitoring image data 322 and generate the quality management event(s) 334 based at least in part on the object recognition data 328 (e.g., generating certain types of events in response to detecting certain objects and/or anomalies in the scene monitoring image data 322).

FIGS. 4-6 are illustrations of an exemplary monitoring view 406 (e.g., corresponding to the VR/AR view 324 provided by the monitoring interface 314). The monitoring view 406 may be presented within a VR/AR interface 404 (e.g., comprised by and/or corresponding to the monitoring interface 314) rendered on a display 402 of a user device 160 (e.g., corresponding to the immersive scene monitoring mobile device).

In the illustrated examples of each of FIGS. 4-6, the depiction of the user device 160, display 402, VR/AR interface 404, and monitoring view 406 may visually resemble a GUI rendered on a (e.g., flat, rectangular) display of a computing device such as a smart phone or tablet, and, in some embodiments, the monitoring view 406 may indeed be presented within a GUI rendered on such a display of such a computing device. However, it will be appreciated that, in some embodiments, including possibly some preferred embodiments, the monitoring view 406 and VR/AR interface 404 may be rendered on other types of displays (e.g., a three-dimensional display, a stereoscopic display, a holographic display, a light field display, and/or any other type of VR display configured to convey depth and/or present immersive simulations of a three-dimensional environment) of other types of immersive scene monitoring mobile devices (e.g., VR headset, smart glasses, wearable heads-up display).

Moreover, in the illustrated examples of each of FIGS. 4-6, the monitoring view 406 comprises a scene image region 408. In various embodiments, the scene image region 408 of the monitoring view 406 may comprise rendered image data (e.g., corresponding to the scene monitoring image data 322) depicting a current instance of a scene associated with the operational system(s) 110 and/or monitored environment(s) 300. In some embodiments, the immersive scene monitoring system 140 may be configured such that the scene image region 408 may correspond to and/or encompass an entire extent of the viewable area of the display 402, which may be a near-eye display (e.g., of a wearable VR headset) such that the rendered image data comprised by the scene image region 408 may be perceptible by the user as a virtual three-dimensional environment in which the user is immersed. In some embodiments, the immersive scene monitoring system 140 may be configured to continuously update the rendered image data comprised by the scene image region 408 to include the most current image of a real-time video stream (e.g., of the scene monitoring image data 322) depicting the current instance of the scene. For example, the monitoring view 406 and/or monitoring interface 314 may be configured such that visible movement and/or changes within the scene are reflected in the image(s) rendered in the scene image region 408 in real time, for example, as new images and/or video frames (e.g., of the scene monitoring image data 322) are continuously captured and rendered in real time. In some embodiments, the immersive scene monitoring system 140 may be configured to continuously update the rendered image data comprised by the scene image region 408 based at least in part on the currently detected pose, position, and/or movement of the immersive scene monitoring mobile device, for example, as changes in the point of view of the camera (e.g., embedded in the immersive scene monitoring mobile device) result in the rendered image data (e.g. of the scene monitoring image data 322) being updated to reflect the changed point of view.

FIG. 4 is an illustration of the monitoring view 406 in an active monitoring state (e.g., during active monitoring of the scene and/or before generation of a quality management event 334). In the illustrated example, the monitoring view 406 in the active monitoring state comprises a (e.g., interactable) form initiation graphical element 410.

In various embodiments, the form initiation graphical element 410 may be rendered such that it is overlaid over a portion of the image data displayed in the scene image region 408 and/or may visually resemble, for example, a selectable virtual button that may prompt interaction with the form initiation graphical element 410 in various ways. In some embodiments, the immersive scene monitoring system 140 may be configured such that the form initiation graphical element 410 may be selectable via voice input 332a, gesture input 332b, and/or GUI interactions, including receiving a predetermined recognizable voice command (e.g., in the voice input 332a) associated with the form initiation graphical element 410 (and/or an operation represented thereby), receiving a predetermined recognizable gesture command (e.g., in the gesture input 332b) associated with the form initiation graphical element 410 (and/or an operation represented thereby), receiving a gesture command (e.g., in the gesture input 332b) with respect to the rendered form initiation graphical element 410 (e.g., gesture input 332b indicative of movement of a cursor or pointer to a position hovered or overlaid over the form initiation graphical element 410 and/or gesture input 332b indicative of selection or activation of the form initiation graphical element 410), and/or receiving GUI input with respect to the form initiation graphical element 410 (e.g., touch input at a region of a touchscreen display corresponding to the form initiation graphical element 410), to list a few examples.

In various embodiments, the immersive scene monitoring system 140 may be configured such that, in response to selection of the form initiation graphical element 410, the monitoring view 406 is updated to prompt for and/or receive additional input for determining generation of a new quality management event 334 (e.g., by displaying additional interactable graphical elements representing various input fields corresponding to attributes of the quality management event 334 to be generated).

FIG. 5 is an illustration of the monitoring view 406 in an event generation input state (e.g., during which input used in generation of a quality management event 334 is prompted for and received). In some embodiments, the immersive scene monitoring system 140 may be configured to update the monitoring view 406 from the active monitoring state to the event generation input state in response to selection of the form initiation graphical element 410, for example, and/or in response to any input (e.g., voice input 332a, gesture input 332b) indicative of initiation of a new form and/or generation of a new quality management event. In the illustrated example, the monitoring view 406 in the event generation state comprises a series of event generation input graphical elements 504, and a record clip graphical element 506.

In various embodiments, similar to the form initiation graphical element 410, each of the event generation input graphical elements 504, record clip graphical element 506, and submit form graphical element 508 may be rendered such that it is overlaid over a portion of the image data displayed in the scene image region 408 and/or may visually resemble, for example, a selectable virtual button and/or GUI input field (e.g., drop menu, text input field) that may prompt interaction with the various graphical elements in various ways, including any of those previously defined and described with respect to the form initiation graphical element 410.

In some embodiments, each of the event generation input graphical elements 504 may represent an input field corresponding to an attribute associated with a quality management event 334 to be generated. For example, the immersive scene monitoring system 140 may be configured such that interactions (e.g., voice commands, gesture commands, GUI interactions) with the event generation input graphical elements 504 may be indicative of selection and/or input of a value to assign to the corresponding attribute, and the immersive scene monitoring system 140 may be configured to generate the quality management event 334 to comprise the selected and/or input value assigned to the corresponding attribute represented by the event generation input graphical element 504.

In the illustrated example, the event generation input graphical elements 504 include a form type selector 504a, a product input field 504b, a batch input field 504c, a part input field 504d, and a notes input field 504e.

The form type selector 504a may correspond to a type of quality management event 334 to be generated, with input and/or selections received via the form type selector 504a determining a type to assign to the quality management event 334 to be generated. In the illustrated example, the form type selector 504a visually resembles a dropdown menu (e.g., of a GUI), and, in some embodiments, the form type selector 504a may enable selection from among a set of possible types (e.g., "Defect Report", "Spill Report", "Risk Report", "Product Inspection") via various types of interactions with the form type selector 504a (e.g., voice commands, gesture commands, GUI interactions).

The product input field 504b may correspond to an identifier associated with a product to which the quality management event 334 to be generated pertains, with input and/or selections received via the product input field 504b determining a product identifier to assign to the quality management event 334 to be generated. In the illustrated example, the product input field 504b visually resembles a text input field (e.g., of a GUI), and, in some embodiments, the product input field 504b may enable input of a value representing the product identifier.

The batch input field 504c may correspond to an identifier associated with a batch of the product being produced to which the quality management event 334 to be generated pertains, with input and/or selections received via the batch input field 504c determining a batch identifier to assign to the quality management event 334 to be generated. In the illustrated example, the batch input field 504c visually resembles a text input field (e.g., of a GUI), and, in some embodiments, the batch input field 504c may enable input of a value representing the batch identifier.

The part input field 504d may correspond to an identifier associated with a part and/or component (e.g., of the operational system(s) 110) used in production of the product, to which the quality management event 334 to be generated pertains, with input and/or selections received via the part input field 504d determining a part identifier to assign to the quality management event 334 to be generated. In the illustrated example, the part input field 504d visually resembles a text input field (e.g., of a GUI), and, in some embodiments, the part input field 504d may enable input of a value representing the part identifier.

The note input field 504e may correspond to text data (e.g., representing notes, comments, narrative information) to be included as part of the quality management event 334 to be generated, with input and/or selections received via the note input field 504e determining note text data to assign to the quality management event 334 to be generated. In the illustrated example, the note input field 504e visually resembles a text input field (e.g., of a GUI), and, in some embodiments, the note input field 504e may enable input of text representing the note text data.

In some embodiments, the event generation input graphical elements 504 presented in connection with generation of a quality management event 334 of a particular type may correspond to data items required for events of the particular type (e.g., as defined in quality management forms associated with each type), and the immersive scene monitoring system 140 may be configured to determine which event generation input graphical elements 504 to present for a particular quality management event 334 being generated based at least in part on the type of event. In one example, in response receiving input indicative of a selection of a type via the form type selector 504a, the immersive scene monitoring system 140 may be configured to update the monitoring view 406 to present a particular set of additional event generation input graphical elements 504 specifically corresponding to the selected type.

In some embodiments, the immersive scene monitoring system 140 may be configured such that one or more of the event generation input graphical elements 504 presented in connection with generation of a quality management event 334 may be automatically populated with input values and/or selections corresponding to items of data (e.g., of the object data 338) based at least in part on a current monitoring context and/or image data depicting the current instance of the scene (e.g., of the scene monitoring image data 322), including possibly any detected objects and/or anomalies depicted in the image data (e.g., according to the object recognition data 328). More particularly, in one example, in response to detecting, via an object recognition process, a particular part or component (e.g., of the operational system(s) 110) in the image data depicting the current instance of the scene (and/or rendered in the scene image region 408), the immersive scene monitoring system 140 may be configured to automatically populate the part input field 504d with a value extracted or derived from stored and retrieved object data, the value corresponding to a part identifier associated with the detected part or component.

In various embodiments, the record clip graphical element 506 may be an interactable graphical element enabling input (e.g., of the media selection input 342) indicative of portions of captured media data (e.g., of the captured media data 340) to be included as part of the quality management event 334 to be generated. For example, the immersive scene monitoring system 140 may be configured such that, in response to selection of the record clip graphical element 506, the monitoring view 406 is updated to prompt for and/or receive additional input for determining selected portions of the captured media data to include as part of the quality management event 334. In another example, the immersive scene monitoring system 140 may be configured such that, in response to selection of the record clip graphical element 506, the immersive scene monitoring system 140 causes initiation of capturing and recording of real-time image, video, and/or audio data depicting the current instance of the scene, and, in response to subsequent selections and/or input (e.g., a second selection of the record clip graphical element 506), the system may be configured to cause termination of the capturing and recording of the media data, with the resulting captured and recorded media being included as part of the quality management event 334 to be generated.

FIG. 6 is an illustration of the monitoring view 406 in a monitoring and anomaly detection state (e.g., during active monitoring of the scene with anomaly detection and/or before generation of a quality management event 334). In the illustrated example, the monitoring view 406 in the monitoring and anomaly detection state comprises the form initiation graphical element 410 (as previously defined and described) along with an anomaly detection graphical element 602.

In various embodiments, the immersive scene monitoring system 140 may be configured such that the anomaly detection graphical element 602 is overlaid over the image data rendered in the scene image region 408 in a particular position with respect to the rendered image data and/or the scene image region 408 based at least in part on an anomaly detected in the currently displayed image data (e.g., as indicated in the object recognition data 328). For example, the anomaly detection graphical element 602 may be overlaid over the currently displayed image data at a position corresponding to that of a depiction of the detected anomaly in the currently displayed image data. In this way, for example, the anomaly detection graphical element 602 may indicate and/or direct attention toward the depiction of the detected anomaly, thus aiding in monitoring process.

In some embodiments, the immersive scene monitoring system 140 may be configured such that the anomaly detection graphical element 602 has particular visual characteristics based at least in part on an anomaly detected in the currently displayed image data (e.g., as indicated in the object recognition data 328). For example, the anomaly detection graphical element 602 may have a particular shape, icon, symbol, and/or text associated with the type of detected anomaly. In another example, the anomaly detection graphical element 602 may comprise rendered text identifying and/or characterizing the detected anomaly and/or containing predetermined recommendation text associated with the detected anomaly and/or type thereof.

In some embodiments, the immersive scene monitoring system 140 may be configured such that the anomaly detection graphical element 602 prompts and/or enables particular interactions (e.g., via the monitoring interface 314) based at least in part on an anomaly detected in the currently displayed image data (e.g., as indicated in the object recognition data 328). In one example, the anomaly detection graphical element 602 may be interactable and/or selectable (e.g., via voice input 332a, gesture input 332b, GUI input), and, in response to particular interactions with and/or selection of the anomaly detection graphical element 602, the immersive scene monitoring system 140 may be configured to update the monitoring view 406 from the monitoring and anomaly detection state to the event generation input state, including possibly automatically populating certain input fields (e.g., corresponding to event generation input graphical elements 504 such as the form type selector 504a) input values and/or selections corresponding to the detected anomaly and/or type thereof. In another example, in response to detection of the anomaly, the immersive scene monitoring system 140 may be configured to automatically update the monitoring view 406 from the monitoring and anomaly detection state to the event generation input state in connection with and/or in parallel with rendering an anomaly detection graphical element 602 corresponding to the detected anomaly.

Having described example systems and/or apparatuses of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sub-process of a second process. Additionally or alternatively, any of the processes may include some or all of the steps described and/or depicted, including one or more optional operational blocks in some embodiments. With respect to the flowcharts discussed below, one or more of the depicted blocks may be optional in some, or all, embodiments of the disclosure. Similarly, it should be appreciated that one or more of the operations of each flowchart may be combinable, replaceable, and/or otherwise altered as described herein.

FIGS. 7 and 8 illustrate flowcharts including operational blocks of example processes in accordance with at least some example embodiments of the present disclosure. In some embodiments, the computer-implemented processes of FIGS. 7 and 8 are embodied by computer program code stored on a non-transitory computer-readable medium of a computer program product configured for execution to perform the computer-implemented method. Alternatively or additionally, in some embodiments, the example processes of FIGS. 7 and 8 are performed by one or more specially configured computing devices, such as the specially configured apparatus 200 (e.g., via configuration circuitry 210, monitoring circuitry 212, event generation circuitry 214, and/or object recognition circuitry 216). In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example processes of FIGS. 7 and 8. In some embodiments, the specially configured apparatus 200 includes and/or otherwise is in communication with one or more external apparatuses, systems, devices, and/or the like, to perform one or more of the operations as depicted and described. While the operational blocks of the example processes are depicted in FIGS. 7 and 8 in a particular order, this should not be understood as requiring that such operations be performed in the particular order shown or in sequential order, or that all illustrated operations be performed.

FIG. 7 illustrates a flowchart including operational blocks of an example process 700 for presenting an immersive scene monitoring interface and generating quality management events, in accordance with at least some example embodiments of the present disclosure.

The process 700 begins at operation 702, at which an apparatus (such as, but not limited to, the apparatus 200 or circuitry thereof as described above in connection with FIG. 2) receives immersive scene configuration data associated with a scene of an operational system. In various embodiments, the immersive scene configuration data received at operation 702 may be generated based at least in part on captured image data depicting at least one past instance of the scene of the operational system. In some embodiments, the immersive scene configuration data received at operation 702 may correspond to and/or comprise the scene configuration data 310 as defined and described with respect to FIG. 3, the scene of the operational system referenced with respect to operation 702 may correspond to and/or comprise the operational system(s) 110 and/or associated monitored environment(s) 300, and any scenes thereof, as defined and described with respect to FIG. 3, and receiving the immersive scene configuration data received at operation 702 may comprise some or all of the analogous functionality attributed to the configuration process 302 and/or the object recognition process 326 as described with respect to FIG. 3. Additionally or alternatively, the captured image data depicting the at least one past instance of the scene referenced with respect to operation 702 may correspond to and/or comprise the scene configuration image data 306 as defined and described with respect to FIG. 3.

At operation 704 of the process 700, an apparatus (such as, but not limited to, the apparatus 200 or circuitry thereof described above in connection with FIG. 2) presents an immersive scene monitoring interface based at least in part on captured image data depicting a current instance of the scene of the operational system referenced with respect to operation 702. In various embodiments, the immersive scene monitoring interface presented at operation 704 may comprise a virtual reality or augmented reality view of the scene displayed on an immersive scene monitoring mobile device. In some embodiments, the immersive scene monitoring interface presented at operation 704 may correspond to and/or comprise the monitoring interface 314 as defined and described with respect to FIG. 3, the captured image data depicting the current instance of the scene based on which the immersive scene monitoring interface is presented at operation 704 may correspond to and/or comprise the scene monitoring image data 322 as defined and described with respect to FIG. 3, and presenting the immersive scene monitoring interface at operation 704 may comprise some or all of the analogous functionality attributed to the monitoring process 312 as described with respect to FIG. 3. Additionally or alternatively, the virtual reality or augmented reality view of the scene referenced with respect to operation 704 may correspond to and/or comprise the VR/AR view 324 as defined and described with respect to FIG. 3, and the immersive scene monitoring mobile device on which the virtual reality or augmented reality view of the scene is displayed with respect to operation 704 may correspond to and/or comprise the immersive scene monitoring mobile device (e.g., of the user devices 160) as defined and described with respect to FIG. 3. Additionally or alternatively, the immersive scene monitoring interface presented at operation 704 may correspond to and/or comprise the VR/AR interface 404 and/or monitoring view 406 as illustrated and described with respect to FIGS. 4-6.

In some embodiments, presenting the immersive scene monitoring interface at operation 704 may comprise detecting one or more anomalies in the image data depicting the current instance of the scene via an object recognition process based at least in part on the image data depicting the current instance of the scene and the immersive scene configuration data received at operation 702 and presenting the immersive scene monitoring interface based at least in part on the detected one or more anomalies. Here, detecting the anomal(ies) at operation 704 may comprise some or all of the analogous functionality attributed to the object recognition process 326 as described with respect to FIG. 3, and presenting the immersive scene monitoring interface based at least in part on the detected anomal(ies) at operation 704 may comprise some or all of the analogous functionality attributed to the monitoring interface 314 and/or monitoring process 312 as described with respect to FIG. 3. Additionally or alternatively, the immersive scene monitoring interface presented based at least in part on the detected anomal(ies) at operation 704 may correspond to and/or comprise the VR/AR interface 404 and/or monitoring view 406 in the monitoring and anomaly detection state as illustrated and described with respect to FIG. 6, including, for example, one or more anomaly detection graphical elements (such as that embodied in the anomaly detection graphical element 602) as illustrated, defined, and described with respect to FIG. 6.

At operation 706 of the process 700, an apparatus (such as, but not limited to, the apparatus 200 or circuitry thereof described above in connection with FIG. 2) receives quality management event generation input via the immersive scene monitoring interface presented at operation 704. In some embodiments, the quality management event generation input received at operation 706 may correspond to and/or comprise the event generation input 334 as defined and described with respect to FIG. 3, the quality management event generation input received at operation 706 may comprise and/or may be derived from the voice input 332a and/or the gesture input 332b as defined and described with respect to FIG. 3, and receiving the quality management event generation input at operation 706 may comprise some or all of the analogous functionality attributed to the monitoring interface 314, voice control element(s) 318, gesture control element(s) 320, monitoring process 312, and/or event generation process 330 as described with respect to FIG. 3. Additionally or alternatively, the quality management event generation input received at operation 706 may correspond to and/or comprise input received via the event generation input graphical elements 504 of the monitoring view 406 in the event generation state as defined and described with respect to FIG. 5.

At operation 708 of the process 700, an apparatus (such as, but not limited to, the apparatus 200 or circuitry thereof described above in connection with FIG. 2) generates one or more quality management events with respect to the current instance of the scene (referenced with respect to operation 704) based at least in part on the quality management event generation input received at operation 706 and the immersive scene configuration data received at operation 702. In various embodiments, the quality management event(s) generated at operation 708 may correspond to and/or comprise the quality management event(s) 334 as defined and described with respect to FIG. 3, and generating the quality management event(s) at operation 708 may comprise some or all of the analogous functionality attributed to the event generation process 330 as described with respect to FIG. 3.

In some embodiments, generating the quality management event(s) at operation 708 may comprise detecting, via an object recognition process, one or more objects in the image data depicting the current instance of the scene (referenced with respect to operation 704) based at least in part on the immersive scene configuration data received at operation 702, retrieving stored object data associated with the detected one or more objects, and automatically populating one or more input fields corresponding to one or more attributes associated with quality management events to be generated based at least in part on the retrieved object data. Here, the stored object data retrieved at operation 708 may correspond to and/or comprise the object data 338 as defined and described with respect to FIG. 3, and detecting the object(s), retrieving the stored object data, and/or automatically populating the input field(s) at operation 708 may comprise some or all of the analogous functionality attributed to the object recognition process 326, monitoring process 312, and/or event generation process 330 as described with respect to FIG. 3. Additionally or alternatively, the input field(s) automatically populated at operation 708 may correspond to, may comprise, and/or may be represented by one or more of the event generation input graphical elements 504 as illustrated, defined, and described with respect to FIGS. 5 and 6, and the input field(s) may be automatically populated in the manner described with respect to the event generation input graphical elements 504 as described with respect to FIGS. 5 and 6.

In some embodiments, generating the quality management event(s) at operation 708 may comprise capturing media data depicting the current instance of the scene (referenced with respect to operation 704), receiving via the immersive scene monitoring interface presented at operation 704 media selection input indicative of selected media clips corresponding to portions of the captured media data depicting the current instance of the scene, and generating the quality management event(s) to comprise the selected media clips. Here, the media data captured at operation 708 may correspond to and/or comprise the captured media data 340 as defined and described with respect to FIG. 3, the media selection input received at operation 708 may correspond to and/or comprise the media selection input 342 as defined and described with respect to FIG. 3, the media selection input received at operation 708 may comprise and/or may be derived from the voice input 332a and/or the gesture input 332b as defined and described with respect to FIG. 3, and receiving the receiving the media selection input at operation 708 may comprise some or all of the analogous functionality attributed to the monitoring interface 314, voice control element(s) 318, gesture control element(s) 320, monitoring process 312, and/or event generation process 330 as described with respect to FIG. 3. Additionally or alternatively, the media selection input received at operation 708 may correspond to and/or comprise input received via the record clip graphical element 506 of the monitoring view 406 in the event generation state as defined and described with respect to FIG. 5.

At operation 710 of the process 700, an apparatus (such as, but not limited to, the apparatus 200 or circuitry thereof described above in connection with FIG. 2) stores the quality management event(s) generated at operation 708 in a data store of a quality management system associated with the operational system (referenced with respect to operation 702). In various embodiments, the quality management system referenced with respect to operation 710 may correspond to and/or comprise the quality management system 120 as defined and described with respect to FIGS. 1 and 3, the data store in which the quality management event(s) are stored at operation 710 may correspond to and/or comprise the quality management data store 336 as defined and described with respect to FIG. 3, and storing the quality management event(s) in the data store at operation 710 may comprise some or all of the analogous functionality attributed to the event generation process 330 as described with respect to FIG. 3.

At operation 712 of the process 700, an apparatus (such as, but not limited to, the apparatus 200 or circuitry thereof described above in connection with FIG. 2) causes the quality management system (referenced with respect to operation 710) to perform one or more quality management operations with respect to the operational system (referenced with respect to operation 702) based at least in part on the quality management event(s) generated at operation 708. In various embodiments, the quality management operation(s) caused to be performed at operation 712 may correspond to and/or comprise the quality management operation(s) 346 as defined and described with respect to FIG. 3.

FIG. 8 illustrates a flowchart including operational blocks of an example process 800 for configuring an immersive scene monitoring system for monitoring of particular scenes, in accordance with at least some example embodiments of the present disclosure.

The process 800 begins at operation 802, at which an apparatus (such as, but not limited to, the apparatus 200 or circuitry thereof as described above in connection with FIG. 2) presents a configuration interface. In various embodiments, the configuration interface presented at operation 802 may correspond to and/or comprise the configuration interface 304 as defined and described with respect to FIG. 3, and presenting the configuration interface at operation 802 may comprise some or all of the analogous functionality attributed to the configuration process 302 as defined with respect to FIG. 3.

At operation 804 of the process 800, an apparatus (such as, but not limited to, the apparatus 200 or circuitry thereof described above in connection with FIG. 2) receives scene configuration input via the configuration interface presented at operation 802. In various embodiments, the scene configuration input received at operation 804 may correspond to and/or comprise the scene configuration input 308 as defined and described with respect to FIG. 3, and receiving the scene configuration input at operation 804 may comprise some or all of the analogous functionality attributed to the configuration process 302 as described with respect to FIG. 3.

At operation 806 of the process 800, an apparatus (such as, but not limited to, the apparatus 200 or circuitry thereof described above in connection with FIG. 2) receives (e.g., via the configuration interface presented at operation 802) captured image data depicting at least one past instance of a scene of an operational system. In various embodiments, the scene of the operational system referenced with respect to operation 806 may correspond to and/or comprise the operational system(s) 110 and/or associated monitored environment(s) 300, and any scenes thereof, as defined and described with respect to FIG. 3, the captured image data depicting the at least one past instance of the scene received at operation 802 may correspond to and/or comprise the scene configuration image data 306 as defined and described with respect to FIG. 3, and receiving the captured image data at operation 806 may comprise some or all of the analogous functionality attributed to the configuration process 302 as described with respect to FIG. 3.

At operation 808 of the process 800, an apparatus (such as, but not limited to, the apparatus 200 or circuitry thereof described above in connection with FIG. 2) generates immersive scene configuration data based at least in part on the scene configuration input received at operation 804 and/or the captured image data received at operation 806. In various embodiments, the immersive scene configuration data generated at operation 808 may correspond to and/or comprise the scene configuration data 310 as defined and described with respect to FIG. 3, and generating the immersive scene configuration data at operation 808 may comprise some or all of the analogous functionality attributed to the configuration process 302 as described with respect to FIG. 3. Moreover, in various embodiments, the immersive scene configuration data generated at operation 808 may correspond to and/or may be comprised by the immersive scene configuration data received at operation 702 of the process 700 as defined and described with respect to FIG. 7. The process 800, including operations 802 through 808, may correspond to and/or may be comprised by operation 702 of the process 700 as defined and described with respect to FIG. 7.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. An apparatus comprising at least one processor and at least one non-transitory memory comprising program code stored thereon, wherein the at least one non-transitory memory and the program code are configured to, with the at least one processor, cause the apparatus to at least:

receive immersive scene configuration data associated with a scene of an operational system, wherein the immersive scene configuration data is generated based at least in part on captured image data depicting at least one past instance of the scene of the operational system, wherein the captured image data depicting the at least one past instance of the scene comprises image data depicting the scene under normal operating conditions and under known anomalous operating conditions;

present an immersive scene monitoring interface based at least in part on captured image data depicting a current instance of the scene of the operational system, wherein the immersive scene monitoring interface comprises a virtual reality or augmented reality view of the scene displayed on an immersive scene monitoring mobile device;

receive quality management event generation input via the immersive scene monitoring interface;

generate one or more quality management events with respect to the current instance of the scene based at least in part on the quality management event generation input and the immersive scene configuration data; and store the one or more quality management events in a data store of a quality management system associated with the operational system.

2. The apparatus of claim 1, wherein the quality management event generation input comprises voice commands and/or recognized gestures detected via the immersive scene monitoring interface and the immersive scene monitoring mobile device.

3. The apparatus of claim 1, wherein the quality management event generation input comprises input indicative of selected event types of quality management events to be generated and/or input indicative of one or more values corresponding to one or more attributes associated with quality management events to be generated.

4. The apparatus of claim 1, wherein generating the one or more quality management events based at least in part on the immersive scene configuration data comprises:
   detecting, via an object recognition process, one or more objects in the image data depicting the current instance of the scene based at least in part on the immersive scene configuration data, retrieving stored object data associated with the detected one or more objects, and automatically populating one or more input fields corresponding to one or more attributes associated with quality management events to be generated based at least in part on the retrieved object data.

5. The apparatus of claim 1, wherein generating the one or more quality management events comprises:
   capturing media data depicting the current instance of the scene,
   receiving via the immersive scene monitoring interface media selection input indicative of selected media clips corresponding to portions of the captured media data depicting the current instance of the scene, and
   generating the one or more quality management events to comprise the selected media clips.

6. The apparatus of claim 1, wherein presenting the immersive scene monitoring interface comprises:
   detecting one or more anomalies in the image data depicting the current instance of the scene via an object recognition process based at least in part on the image data depicting the current instance of the scene and the immersive scene configuration data; and
   presenting the immersive scene monitoring interface based at least in part on the detected one or more anomalies.

7. The apparatus of claim 1, wherein the immersive scene monitoring mobile device is a wearable device.

8. The apparatus of claim 1, wherein the image data depicting the current scene is captured via one or more embedded cameras of the immersive scene monitoring mobile device and/or one or more cameras that are external with respect to the immersive scene monitoring mobile device, positioned at the scene, and in communication with the immersive scene monitoring mobile device.

9. The apparatus of claim 1, wherein the operational system is associated with a pharmaceutical research, manufacturing, and/or distribution process, and the scene of the operational system comprises views of laboratory, production line, and/or material handling environments associated with the pharmaceutical research, manufacturing, and/or distribution process.

10. A computer-implemented method comprising:
    receiving immersive scene configuration data associated with a scene of an operational system, wherein the immersive scene configuration data is generated based at least in part on captured image data depicting at least one past instance of the scene of the operational system, wherein the captured image data depicting the at least one past instance of the scene comprises image data depicting the scene under normal operating conditions and under known anomalous operating conditions;
    presenting an immersive scene monitoring interface based at least in part on captured image data depicting a current instance of the scene of the operational system, wherein the immersive scene monitoring interface comprises a virtual reality or augmented reality view of the scene displayed on an immersive scene monitoring mobile device;
    receiving quality management event generation input via the immersive scene monitoring interface;
    generating one or more quality management events with respect to the current instance of the scene based at least in part on the quality management event generation input and the immersive scene configuration data; and
    storing the one or more quality management events in a data store of a quality management system associated with the operational system.

11. The method of claim 10, wherein the quality management event generation input comprises voice commands and/or recognized gestures detected via the immersive scene monitoring interface and the immersive scene monitoring mobile device.

12. The method of claim 10, wherein the quality management event generation input comprises input indicative of selected event types of quality management events to be generated and/or input indicative of one or more values corresponding to one or more attributes associated with quality management events to be generated.

13. The method of claim 10, wherein generating the one or more quality management events based at least in part on the immersive scene configuration data comprises detecting, via an object recognition process, one or more objects in the image data depicting the current instance of the scene based at least in part on the immersive scene configuration data, retrieving stored object data associated with the detected one or more objects, and automatically populating one or more input fields corresponding to one or more attributes associated with quality management events to be generated based at least in part on the retrieved object data.

14. The method of claim 10, wherein generating the one or more quality management events comprises capturing media data depicting the current instance of the scene, receiving via the immersive scene monitoring interface media selection input indicative of selected media clips corresponding to portions of the captured media data depicting the current instance of the scene, and generating the one or more quality management events to comprise the selected media clips.

15. The method of claim 10, wherein presenting the immersive scene monitoring interface comprises:
    detecting one or more anomalies in the image data depicting the current instance of the scene via an object recognition process based at least in part on the image data depicting the current instance of the scene and the immersive scene configuration data; and
    presenting the immersive scene monitoring interface based at least in part on the detected one or more anomalies.

16. The method of claim 10, wherein the immersive scene monitoring mobile device is a wearable device.

17. The method of claim 10, wherein the image data depicting the current scene is captured via one or more embedded cameras of the immersive scene monitoring mobile device and/or one or more cameras that are external with respect to the immersive scene monitoring mobile device, positioned at the scene, and in communication with the immersive scene monitoring mobile device.

18. A computer program product comprising at least one non-transitory computer-readable storage medium having computer-readable program code portions stored therein, the computer-readable program code portions comprising an executable portion configured to:
- receive immersive scene configuration data associated with a scene of an operational system, wherein the immersive scene configuration data is generated based at least in part on captured image data depicting at least one past instance of the scene of the operational system, wherein the captured image data depicting the at least one past instance of the scene comprises image data depicting the scene under normal operating conditions and under known anomalous operating conditions;
- present an immersive scene monitoring interface based at least in part on captured image data depicting a current instance of the scene of the operational system, wherein the immersive scene monitoring interface comprises a virtual reality or augmented reality view of the scene displayed on an immersive scene monitoring mobile device;
- receive quality management event generation input via the immersive scene monitoring interface;
- generate one or more quality management events with respect to the current instance of the scene based at least in part on the quality management event generation input and the immersive scene configuration data; and
- store the one or more quality management events in a data store of a quality management system associated with the operational system.

\* \* \* \* \*